US010135879B1

(12) United States Patent
Tucker, IV et al.

(10) Patent No.: US 10,135,879 B1
(45) Date of Patent: Nov. 20, 2018

(54) ANONYMIZATION OVERLAY NETWORK FOR DE-IDENTIFICATION OF EVENT PROXIMITY DATA

(71) Applicants: Arthur Oliver Tucker, IV, Annapolis, MD (US); Christopher Delton Karlen, Woodbury, MN (US)

(72) Inventors: Arthur Oliver Tucker, IV, Annapolis, MD (US); Christopher Delton Karlen, Woodbury, MN (US)

( * ) Notice: Subject to any disclaimer, the term of this patent is extended or adjusted under 35 U.S.C. 154(b) by 0 days.

(21) Appl. No.: 15/703,973

(22) Filed: Sep. 13, 2017

Related U.S. Application Data

(60) Provisional application No. 62/553,774, filed on Sep. 1, 2017.

(51) Int. Cl.
| | |
|---|---|
| *H04L 29/06* | (2006.01) |
| *H04W 4/04* | (2009.01) |
| *G06Q 20/32* | (2012.01) |
| *H04W 4/029* | (2018.01) |
| *H04W 12/02* | (2009.01) |
| *H04W 4/021* | (2018.01) |

(52) U.S. Cl.
CPC ....... *H04L 63/302* (2013.01); *G06Q 20/3223* (2013.01); *H04W 4/029* (2018.02); *H04W 4/04* (2013.01); *H04W 4/021* (2013.01); *H04W 12/02* (2013.01)

(58) Field of Classification Search
CPC ........ H04W 4/02; H04W 4/206; H04W 12/02
See application file for complete search history.

(56) References Cited

U.S. PATENT DOCUMENTS

| | | | |
|---|---|---|---|
| 2011/0143776 A1* | 6/2011 | Shankaranarayanan | ..................... G06Q 10/06 455/456.3 |
| 2014/0038544 A1* | 2/2014 | Jones | ................... G08B 13/196 455/404.2 |
| 2014/0129628 A1* | 5/2014 | Fletcher | ................ H04W 12/02 709/204 |

OTHER PUBLICATIONS

Chris Buck, "High Ratings Desus & Mero Judge Fall TV," Wired Magazine, Sep. 2017, pp. cover, 30-31.

\* cited by examiner

*Primary Examiner* — Jaime Holliday

(57) ABSTRACT

A system comprising: mobile computing devices; an anonymization network; a server computing device coupled to each mobile computing device, and wherein each mobile computing device sends, using the anonymization network, a set of locations to the server computing device; wherein the server computing device: based at least in part on determining that a location is within a threshold distance of a location of a crime, generates a proximity indication; in response to receiving an indication of a remittance for the crime from at least one other user, stores an association between the remittance and the crime; in response to receiving descriptive data for the crime, sends the descriptive data to one other mobile computing device; performs an operation that provides the remittance to the user in response to receiving an indication from a mobile computing device that outputs a user interface with the descriptive data associated with the proximity indication.

12 Claims, 14 Drawing Sheets

ANONYMIZATION OVERLAY NETWORK FOR DE-IDENTIFICATION OF EVENT PROXIMITY DATA

This application claims the benefit of U.S. Provisional Application No. 62/553,774, filed Sep. 1, 2017, which is hereby expressly incorporated by reference herein.

TECHNICAL FIELD

This disclosure relates to computer networks and, more specifically, to anonymizing data traffic traversing computing networks.

BACKGROUND

Some computing devices provide a graphical user interface to output content for display and receive input from a user to interact with the computing device. In some instances, these computing devices may also communicate with one another using one or more networks. Communications between computing devices using such networks may rely on one or more network protocols, such Transmission Control Protocol (TCP) and Internet Protocol (IP), to transmit data. In some instances, users may share data with one another using one or more content sharing platforms. Content sharing platforms may include instant messaging networks, social networks, and electronic mail. Service operators of content sharing platforms may store data that personally identifies each user's computing device (or user itself) and may log or otherwise track device information about each user computing device that accesses the content sharing platforms. As such, content provided to these content sharing platforms are traceable to the submitting user computing devices, such that the identities of the owners or users of these user computing devices may be discovered.

SUMMARY

Techniques of this disclosure are directed to an anonymization overlay network (or "anonymization network") for de-identification of crime-proximity data. In some examples, multiple different mobile computing devices (e.g., smartphones) assigned to different users may include respective user applications that communicate over an anonymization network to a server computing device. The server computing device may operate a service in which each respective user application is assigned a user identifier that does not or cannot personally identify a user of the mobile computing device that includes the user application. Using the user identifier, the user application may anonymously send the locations of the mobile computing device over the anonymization network to the server computing device.

The server computing device, which cannot personally identify a mobile computing device or the user, but can distinguish between different users that use the service, may determine whether a location of the mobile computing device is within a threshold time and threshold distance of a crime that has occurred and generate a proximity indication that the mobile computing device was proximate to the crime. In response to the user submitting descriptive data that is descriptive of the crime, the server computing device may broadcast or otherwise distribute the descriptive data to other user applications that access the same service of the server computing device. These other user applications may output for display the descriptive data in association with the proximity indication and the user identifier of the user that submitted the descriptive data. In some examples, the system may associate incognito or anonymous remittances with a crime that are released to submitters of descriptive data (e.g., users in close proximity to the crime).

Rather than operating in a way that could personally identify or permit discovery of the personal identity of a user who provides descriptive data of a crime, the system described in this disclosure operates fundamentally differently than conventional content sharing platforms by integrating anonymous user identifiers with an anonymization network to permit the exchange of data that are descriptive of crimes. By providing an end-to-end, anonymous communication channel in which incognito remittances can be released to users who exchange data that are descriptive of crimes, the techniques of this disclosure may improve the security of data exchanged between mobile computing devices and can increase the privacy of users on the system. Furthermore, by providing increased data security and privacy using an anonymization network and anonymous user identifier with incognito remittances to create an end-to-end, anonymous communication channel, techniques of this disclosure may enable and/or incentive users to exchange data that are descriptive of crimes, which would not otherwise be exchanged if such security, privacy, and integrated remittance distribution were not integrated a system that provides an intuitive, efficient, and secure user experience.

In some examples, a system includes a plurality of mobile computing devices associated with a plurality of respective users; an anonymization network; at least one server computing device communicatively coupled to each mobile computing device of the plurality of mobile computing devices, and wherein each respective mobile computing device of the plurality of mobile computing devices sends, using the anonymization network, a respective set of locations of the respective mobile computing to the at least one server computing device, such that the plurality of mobile computing devices are anonymous to the at least one server computing device; wherein the at least one server computing device, based at least in part on a determination that a location from a set of locations of one of the mobile computing devices is within a threshold distance of a location of a crime, generates a proximity indication that a user associated with the one of the mobile computing devices is proximate to the crime; wherein the at least one server computing device, in response to receiving an indication of a remittance for the crime from at least one other user, stores an association between the remittance and the crime; wherein the at least one server computing device, in response to receiving, using the anonymization network, descriptive data generated by the user that is descriptive of the crime, sends the descriptive data to at least one other mobile computing device of the plurality of computing devices that is associated with the at least one other user; and wherein the server computing device performs at least one operation that provides the remittance to the user in response to receiving, from the at least one other mobile computing device that outputs a user interface in which the descriptive data is associated with the proximity indication, an indication to release the remittance provided by the at least one other user.

In some examples, a server computing device includes one or more computer processors; and a memory comprising instructions that when executed by the one or more computer processors cause the one or more computer processors to: receive, using an anonymization network and from a respective mobile computing device of a plurality of mobile computing devices, a respective set of locations of the respective mobile computing device, such that the respective mobile computing device is anonymous to the at least one server computing device; generate, based at least in part on a determination that a location from the respective set of locations of the respective mobile computing device is within a threshold distance of a location of a crime, a proximity indication that a user associated with the respective mobile computing device is proximate to the crime; in response to receiving an indication of a remittance for the crime from at least one other user, generate an association between the remittance and the crime; in response to receiving, using the anonymization network, descriptive data generated by the user that is descriptive of the crime, send the descriptive data to at least one other mobile computing device of the plurality of mobile computing devices that is associated with the at least one other user; and perform at least one operation that provides the remittance to the user in response to receiving, from the at least one other mobile computing device that outputs a user interface in which the descriptive data is associated with the proximity indication, an indication to release the remittance provided by the at least one other user.

In some examples, a mobile computing device includes one or more computer processors; and a memory comprising instructions that when executed by the one or more computer processors cause the one or more computer processors to: send, using an anonymization network and to a server computing device, a respective set of locations of the mobile computing device, such that the mobile computing device is anonymous to the server computing device, and wherein the respective set of locations are usable by the server computing device to generate, based at least in part on a location from a set of locations being within a threshold distance of a location of a crime, a proximity indication that a user associated with the mobile computing devices is proximate to the crime; in response to receiving an indication of a remittance for the crime from the server computing device, contemporaneously output for display an indication of the remittance in association with an indication of the crime; in response to receiving descriptive data generated by the user that is descriptive of the crime, send, using the anonymization network, the descriptive data to the server computing device, and output a user interface in which the descriptive data is associated with the proximity indication; and in response to receiving, from the server computing device, a message that the remittance is provided to the user, output for display an indication that the remittance is provided to the user.

The details of one or more examples are set forth in the accompanying drawings and the description below. Other features, objects, and advantages of the disclosure will be apparent from the description and drawings, and from the claims.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
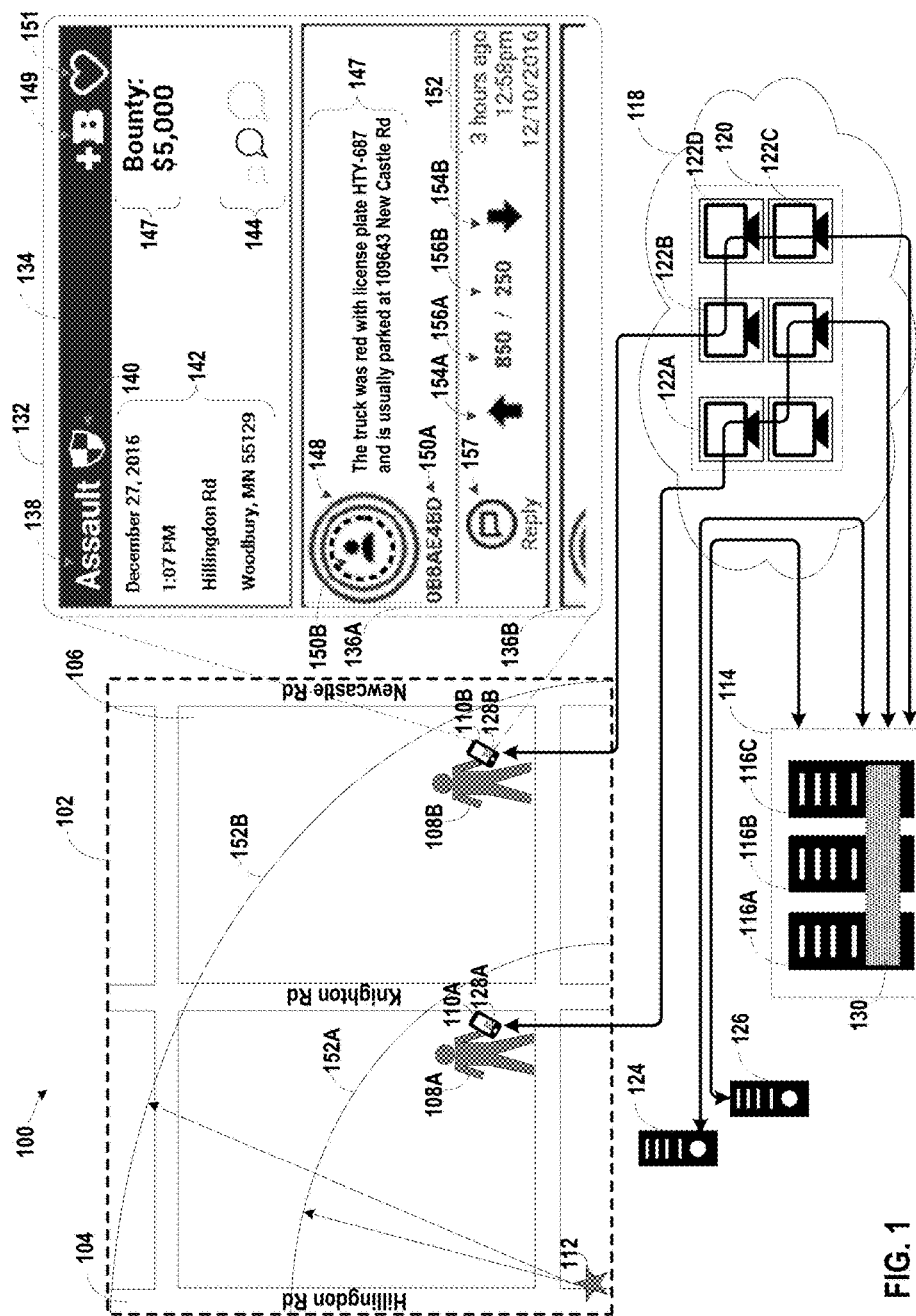
FIG. 1 is a conceptual diagram illustrating an example system with and anonymization overlay network for de-identification of crime-proximity data, in accordance with one or more aspects of the present disclosure.

FIG. 1 is a conceptual diagram illustrating an example system 100 with an anonymization overlay network for de-identification of crime-proximity data, in accordance with one or more aspects of the present disclosure. FIG. 1 includes a conceptual diagram of a map 102 of a city that includes roads (e.g., road 104) and city blocks (e.g., city block 106). In some examples, roads may be sidewalks, pathways, railways, or any other area designated for traveling from one location to another. City blocks may include buildings, parks, or any other regions that are not roads. Although described with respect to roads and city blocks in FIG. 1, techniques of this disclosure may be used in any geographic setting, which may or may not include roads and city blocks.

Map 102 further illustrates users 108A and 108B ("users 108"). Users 108 may work, travel, and otherwise live at various different locations represented by map 102. Users 108 may each own, carry, and/or use one or more mobile computing devices. For instance user 108A may own, carry, and use mobile computing device 110A and user 108B may own, carry, and use mobile computing device 110B. Mobile computing devices 110A and 110B may be referred to as mobile computing devices 110. Map 102 further illustrates crime location 112 which may be a location of a crime. Map 102 may include any number of crime locations. In some examples, crime location may be a location where a crime has occurred or where a crime is suspected to occur. In some examples, an event location (not shown) may be included in map 102. An event location may be a crime location or may be any location of interest where an event occurred. For instance, an event may not be a crime. An event may be a mass gathering, assembly, congregation of people of a threshold size in a region or location, an occurrence at a region or location, and/or any other happening at a time or during a time range and/or at location or region. Although described with respect to a crime location in FIG. 1, techniques of this disclosure may be applied to any event location.

In the example of FIG. 1, mobile computing devices 110 may be smartphones. In some examples, a smartphone may be a mobile personal computer with an operating system and one or more applications. Further details of mobile computing devices 110 are described in FIG. 3. In other examples, mobile computing devices 110 may be wearable computing devices such as smartwatches, computerized fitness band/ trackers, computerized eyewear, computerized headwear, computerized gloves, and the list. In other examples, mobile computing devices 110 may be any type of mobile computing device that can attach to and be worn on a person's body or clothing. In still other examples mobile computing devices 110 may be tablet computers, personal digital assistants (PDA), game systems or controllers, media players, e-book readers, television platforms, navigation systems, remote controls, or other mobile computer that can easily be moved by a user.

Mobile computing devices 110 may include one or more components. Some components described herein use software, hardware, firmware, or a mixture of both hardware, software, and firmware residing in and executing on mobile computing devices 110 or at one or more other remote computing devices to perform the operations and provide the functionality described in this disclosure. Mobile computing devices 110 may execute instructions of some components (e.g., implemented with a mixture of hardware, software, and/or firmware) with one or more processors. Mobile computing devices 110 may execute instructions of some components as or within a virtual machine executing on underlying hardware. As described herein, components may be implemented in various ways. For example, some components may be implemented as a downloadable or pre-installed application or "app." In other examples, some components may be implemented as part of an operating system of a mobile computing device.

FIG. 1 further illustrates data center 114. Data center 114 includes multiple server computing devices 116A, 116B, 116C ("server computing devices 116"), which collectively may provide one or more services of server application 130. In some examples, a service provider may operate and administrate the one or more services. Although three server computing devices are shown for example purposes in FIG. 1, any number of server computing devices may be included in data center 114. In some examples, each of server computing devices 116 may be communicatively coupled to one another and/or to network 118. In some examples, server computing devices 116 may be communicatively coupled to one another within data center 114 and/or to network 118 using one or more network devices, such as switches, routers, and hubs (not shown) that are interconnected using one or more communication link, which may be wired and/or wireless. Examples of communication links may be CAT-5, CAT-6, CAT7 or any other physical links. Examples of communication links may wireless connections such as WiFi, 4G LTE, and/or any other wireless links.

As further described in this disclosure, server computing devices 116 may include one or more components. Some components described herein use software, hardware, firmware, or a mixture of both hardware, software, and firmware residing in and executing on server computing devices 116 or at one or more other remote computing devices to perform the operations and provide the functionality described in this disclosure. Server computing devices 116 may execute instructions of some components (e.g., implemented with a mixture of hardware, software, and/or firmware) with one or more processors. Server computing devices 116 may execute instructions of some components as or within a virtual machine executing on underlying hardware.

FIG. 1 illustrates network 118. Network 118 represents a publicly accessible computer network that is owned and operated by a service provider, which is usually large telecommunications entity or corporation. Network 118 is usually a large layer three (L3) computer network, where reference to a layer followed by a number refers to a corresponding layer in the Open Systems Interconnection (OSI) model. Network 118 is a L3 network in the sense that it natively supports L3 operations as described in the OSI model. Common L3 operations include those performed in accordance with L3 protocols, such as the Internet protocol (IP).

Network 118 may provide access to the Internet, and may allow the computing devices within different customer networks to communicate with each other. Network 118 may include a variety of network devices other than PEs 10. Although additional network devices are not shown for ease of explanation, it should be understood that network 118 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the some elements of system 100 are illustrated as being directly coupled, it should be understood that one or more additional network elements may be included along any communication links or channels such that the network elements of system 100 are not directly coupled.

FIG. 1 further illustrates anonymization network 120. Anonymization network 120 may include one or more relays (e.g., relays 122A, 122B and other relays delineated within anonymization network 120, collectively "relays 122" or "relay network devices"), where each relay is a computing device, such as a desktop computing device, laptop, mobile computing device, server, or any other computing device. Each of relays 122 may include a component or application that communicates with one or more other relays to establish a route from a source device (e.g., 110B) that sends data to a destination device (e.g., data center 114 or server computing device 116C within data center 114) and anonymize the source device from the destination device.

In some examples, onion routing is implemented within anonymization network 120 such that encryption in the application layer of a communication protocol stack encrypts data, including the next node (e.g., relay) destination IP address, one or more times and sends it through a virtual circuit comprising successive, randomly selected relays. In some examples, each relay decrypts a layer of encryption to reveal only the next relay in the circuit in order to pass the remaining encrypted data on to it. The final relay decrypts the innermost layer of encryption and sends the original data to its destination without revealing, or even knowing, the source IP address. Because the routing of the communication is partly concealed at one or more hops in the circuit, onion routing may eliminate any single point at which the communicating peers can be determined through network surveillance that relies upon knowing its source and destination. In some examples, anonymization network 120 may be implemented with software executing on one or more relays that conforms to the Tor Protocol Specification, https://gitweb.torproject.org/torspec.git/tree/tor-spec.txt, Aug. 2, 2017, which is hereby incorporated by reference in its entirety.

For illustration purposes, anonymization network 120 may include a component or application that implements the Tor Protocol Specification at each of relays 122, although anonymization network 120 may be implemented with any other component, application, and/or specification that anonymizes the source device from the destination device. For instance, in another example, anonymization network may be implemented with software executing on one or more relays that conform to I2P Project Specifications, https://geti2p.net/spec, Aug. 2, 2017, which is hereby incorporated by reference in its entirety. Although anonymization networks are illustrated for example purposes in FIG. 1, any technique, component, and/or implementation that anonymizes the source device from the destination device may be used, whether implemented as anonymization network or otherwise. In some examples, a Virtual Private Network, FreeNet, Whonix, or any other suitable component and/or network that anonymizes the source device from the destination device may be used. The operation of anonymization network 120 in accordance with techniques of this disclosure is further described herein.

In the example of FIG. 1, anonymization network 120 includes an ingress relay network device 122B communicatively coupled to mobile computing device 110B. An ingress relay network device may the entry point of data sent by mobile computing device 110B into anonymization network 120. Anonymization network 120 may include an egress relay network device 122C communicatively coupled to at least one server computing device in data center 114. An egress relay network device may be an exit point from anonymization network 120 for data sent by mobile computing device 110B. Anonymization network 120 may include one or more intermediate relay network devices, such as intermediate relay network device 122D. Ingress relay network device 122B, intermediate relay network devices (e.g., device 122D), and egress relay network device 122C may collectively provide a communication route between the mobile computing device 110B and the at least one server computing device in data center 114. In some examples, descriptive data is received by ingress relay network device 122B from the mobile computing device 110B, and each relay network device in the set of relay network devices encrypts the descriptive data before the descriptive data is forwarded to another relay network device in the communicate route. In some examples, egress relay network device 122C decrypts the descriptive data and forwards the descriptive data to the at least one server computing device in data center 114, such that the plurality of mobile computing devices are anonymous to the at least one server computing device. In some examples, a mobile computing device is anonymous to a server computing device if it is unknown to the server computing device the identity of the mobile computing device on a network using an addressing system or protocol of the network that is used to identify computing devices. In some examples, a user is anonymous to a server computing device if it is unknown to the server computing device, the personal identity of the user, and/or the identity of the mobile computing device on the network using an addressing system or protocol of the network that is used to identify computing devices.

FIG. 1 further illustrates crime data server 124. Crime data server 124 may include one or more components and/or applications that generate, receive, store, process, and/or transmit data descriptive of crimes. For instance, crime data server 124 may include a datastore with one or more records or entities, wherein each record or entity includes data describing a particular crime. For instance, data describing a particular crime may include but is not limited to: crime type, crime location (e.g., latitude/longitude, street address, city state, zip), crime date, crime time, or any other data that describes a crime. In some examples, crime data server 124 may, more generally, be an event data server that stores event data descriptive of events. Crime data server 124 may provide crime data to data center 114 as described in this disclosure. In some examples, crime data server 124 may provide crime data to data center 114 via network 118 using or not using anonymization network 120. In some examples, crime data server 124 may be included within data center 114 and/or functionality provided by crime data server 124 may be included in server computing devices 116.

FIG. 1, illustrates payment server 126. Payment server 126 may represent one or more computing devices that provide payment processing services. For instance, payment server 126 may support money transfers, which may be online or otherwise network based. As an example, services provided by payment server 126 allow users to execute financial transactions online by granting the ability to transfer funds electronically between different users. Examples of such service providers may include PayPal, Stripe, Square, Western Union, or any other service that supports online money transfers.

In some examples, payment server 126 may facilitate cryptocurrency transfers. A cryptocurrency may be a digital asset that operates as a medium of exchange using cryptography to secure the transactions and to control the creation of additional units of the currency. Some cryptocurrencies, which may be used in accordance with techniques of this disclosure, such as BitCoin and Ethereum, may be blockchain-based while others may not. A blockchain may be a distributed database that is used to maintain a continuously growing list of records, called blocks. Each block contains a timestamp and a link to a previous block. A blockchain is typically managed by a peer-to-peer network collectively adhering to a protocol for validating new blocks. In some examples, cryptocurrencies or other forms of money transfer may anonymize the recipient of funds from the provider of such funds. In this way, the identity of the recipient of the funds may not be known to the provider of such funds.

In accordance with techniques of this disclosure, each of mobile computing devices 110A, 110B may include a user application 128A, 128B ("user applications 128"), respectively, that implement techniques of this disclosure. Each of user applications 128 may be downloaded from an application store, such as the Google Play Store or the Apple App Store. User 108A, for example, may provide one or more user inputs at mobile computing device 110A that cause mobile computing device 110A to download user application 128A. Upon initially executing user application 128A for the first time at mobile computing device 110A, user application 128A may establish a connection with server application 130 executing at data center 114 via anonymization network 120. Server application 130 may perform one or more techniques of this disclosure, and may execute independently or collectively one or more of server computing devices 116.

At first-time execution, user application 128A may send one or more types of information via anonymization network 120 to server application 130, which application 130 may use to generate a unique user identifier for user 108A, which is stored and used by each of application 130 and user application 128A. In some examples, the one or more types of information sent by user application 128A do not personally identify and cannot personally identify mobile computing device 110A or user 108A. For instance, the one or more types of information may be a random number, a timestamp, a hash value, or any other type of information. Server application 130 may apply one or more functions or other operations to the one or more types of information received from mobile computing device 128A to generate a user identifier for user 108A. For instance, server application may apply a hash function, random number generation function, or any other function to the one or more types of information to generate the user identifier for user 108A. Accordingly, server application 130 may generate, store, and use the unique user identifier that is associated with user 108A and/or mobile computing device 110A for purposes of distinguishing between different unique users and/or devices in system 100, but cannot be used to personally identify or physically locate user 108A and/or mobile computing device 110A. In this way, server application 130 may maintain identifiers for different unique users and/or mobile computing device without maintaining information that can be used to personally identify and/or physically locate users or mobile computing devices that use services provided by server application 130. User 108B may cause user application 128B to be installed and configured in a similar matter at mobile computing device 110B.

In the example of FIG. 1, each respective mobile computing device of mobile computing devices 110 sends, using anonymization network 120, a respective set of locations of the respective mobile computing to at least one server computing device of data center 114, such that respective source addresses of mobile computing devices 110 are unknown to data center 114. For example, user application 128A may determine location data for mobile computing device 110A. In some examples, each instance of location data may be associated with a metadata, such as but not limited to: a timestamp when mobile computing device 110A was detected at the particular location represented by the location data, a user identifier, an elevation, an environmental condition, or any other data associated with or descriptive of the location. Location data of mobile computing device 100A may be GPS coordinates (e.g., latitude and longitude pairs), generic-named locations (e.g., "home", "work", "school"), literal-named locations (e.g., "1508 Westview Drive", "Target Field", etc.), or any other suitable encoding or representation of location information.

In some examples, user application 128A may detect and store location data periodically or according to a defined interval. For instance, user application 128A may detect and store location data according to a hard-coded, user-defined, and/or machine-generated interval. In example examples the defined interval may be enumerated in millisecond, seconds, minutes, hours, or days, to name only a few examples. In some examples, the interval may be within a range of 1-120 minutes. In some examples, the interval may be within a range of 1 and 24 hours. In some examples, the define interval may be 5 minutes, 15 minutes, 30 minutes, 60 minutes, 2 hours, 6 hours, or 12 hours. In some examples, user application 128A may detect and store location data according to a schedule which may be hard-coded, user-defined, and/or machine generated.

In some examples, user application 128A may detect and store location data according to one or more asynchronous events. For instance, user application 128A may detect and store location data for a particular location in response to mobile computing device 110A moving from one unique location to a different unique location. In some examples, user application 128A may receive location data from a provider service implemented by a runtime environment, operation system or other component that provides an updated location to any listener or subscriber component, such as user application 128A. In this way, as mobile computing device moves from one location to another, user application 128A may receive location data that represents the new location from the provider service. In some examples, mobile computing device 110A and/or, more particularly the provider service, may provide updated location data for changes in location that satisfy a threshold distance change between a prior location and a subsequent, new location.

In some examples, user application 128A sends one or more sets of one or more instances of location data (and, in some examples, corresponding metadata) to server application 130. User application 128A may send a set of location data as the location data is received or generated by user application 128A, such as in real-time or near-real-time. In some examples, user application 128A may send a set of location data in response in response to one or more asynchronous events. An asynchronous event may not occur on a periodic basis or according to a defined time interval. Examples of asynchronous events may be but are not limited to: a storage size threshold is exceeded, a particular network type (e.g., wifi, Ethernet, LTE, etc.) is detected, a user input is received, or any other event that may not occur on a periodic basis or according to a defined time interval.

In other examples, user application 128A may send one or more sets of location data to server application 130 periodically or according to a defined interval. For instance, user application 128A may send one or more sets of location data to server application 130 according to a hard-coded, user-defined, and/or machine-generated interval. In example examples the defined interval may be enumerated in millisecond, seconds, minutes, hours, or days, to name only a few examples. In some examples, the interval may be within a range of 1-120 minutes. In some examples, the interval may be within a range of 1 and 24 hours. In some examples, the defined interval may be 5 minutes, 15 minutes, 30 minutes, 60 minutes, 2 hours, 6 hours, or 12 hours. In some examples, user application 128A may send one or more sets of location data to server application 130 according to a schedule which may be hard-coded, user-defined, and/or machine generated.

As described above, a source address of mobile computing device 110A may be unknown to server application 130 when server application 130 receives the one or more sets of location data from mobile computing device 110A because the one or more sets of location data are transmitted to server application 130 using anonymization network 120. In some examples, a source address may be the source IP address for mobile computing device 110A. In some examples, respective identifiers of mobile computing devices are respective source network addresses of the respective mobile computing devices, and the respective identifiers of the mobile computing devices are unknown to server computing devices in data center 114.

In other examples, a non-IP based network or network that uses other addressing techniques in addition to or in lieu of IP, the source address may any identifier that identifies the mobile computing device on the network. More generally, in non-address based networks, communication channels, or any communication medium, server application 130 may receive the one or more sets of location data from mobile computing device 110A without one or more identifiers that would enable identification of mobile computing device 110A, except that in such cases, the user identifier generated by server application 130 for user 108A may be included with or otherwise accompany the one or more sets of location data. In any case, server application 130 may store the one or more sets of location data from mobile computing device 110A in association with the user identifier for user 108A. Similarly, server application 130 may store the one or more sets of location data from mobile computing device 110B in association with the user identifier for user 108B.

Server application 130 may receive crime data from crime data server 124 and/or generate crime data. Server application 130 may, based at least in part on determining that a location from a set of locations of one of the mobile computing devices, is within a threshold distance of a location of a crime, generate a proximity indication that a user associated with the one of the mobile computing devices is proximate to the crime. For instance, server application 130 may determine a distance between crime 112 and an instance of location data from user application 128A that indicates a respective location of mobile computing device 110A as shown in map 102. Server application 130 may generate the distance as a Euclidean distance, although any suitable distance calculation may be used. In some examples, server application 130 may determine a distance between crime 112 and an instance of location data from user application 128A that indicates a respective location of mobile computing device 110A if server application 130 determines that an amount of time between a timestamp of the crime and a timestamp of the instance of location data satisfies a time threshold (e.g., is less than or equal to the time threshold). Although described using timestamps for example purposes, any representation of time and/or dates may be used. The time threshold may be hard-coded, user-defined, or machine generated. In some examples, the time threshold may be enumerated in millisecond, seconds, minutes, hours, or days, to name only a few examples. In some examples, the interval may be within a range of 1-180 minutes. In some examples, the interval may be within a range of 1 and 24 hours. In some examples, the defined interval may be 1 minute, 5 minutes, 15 minutes, 30 minutes, 60 minutes, 2 hours, 6 hours, or 12 hours.

In accordance with techniques of this disclosure, server application 130 may determine a set of respective distances between each crime of a set of crimes and each instance of location data from a set of location data. For example, server application 130 may determine a set of respective distances between each crime of a set of crimes that includes crime 112 and each instance of location data from a set of location data that was sent by user application 128A to server application 130. Further, in FIG. 1, server application 130 determines the respective distances for those instances of location data having timestamps which, when compared to the timestamps of respective crimes in the set of crimes, have a time duration that is less than or equal to a time threshold. In the example of FIG. 1, the time threshold is 30 minutes, and as such, server 130 determines respective distances for those instances of location data having timestamps which, when compared to the timestamps of respective crimes in the set of crimes, are 30 minutes or less between the timestamp of respective crime and the respective instance of location data. In this way, server application 130 may determine the respective distances between user mobile computing device 110A and crime 112 when mobile computing device 110A was temporally proximate (e.g., within the time threshold) to crime 112.

Server application 130 generate, store, provide, send, or otherwise indicate that a user is in proximity to a particular crime. A user may be in proximity to a crime if a location of the mobile computing device of the user is within a threshold distance of the particular crime. As described in this disclosure, a mobile computing device may receive data from server application 130 that enables the mobile computing device to indicate that at least one other user was in proximity to a crime. In this way, the user of the mobile computing device may determine that the at least one other user was in proximity to the crime. As such, the user of the mobile computing device may determine that if the at least one other user is proximate to the particular crime, then the information provided by the at least one other user about the crime may be more accurate, truthful, credible, or otherwise useful in characterizing or describing the crime.

In the example of FIG. 1, user application 128B may output for display a user interface 132. User interface 132 is one example of a user interface that may provide functionality in accordance with techniques of this disclosure; however, other arrangements of the content of user interface 132 are possible. Although user interface 132 includes certain content in FIG. 1 for example purposes, additional content may be included in the user interface and in other examples only a subset of content shown in user interface 132 of FIG. 1 may be included. In some examples, the appearance of content may be different that in FIG. 1 although such content may provide equivalent or similar functionality. For instance, an indication that a user's computing device is proximate to a crime may be represented in any number of ways, the example of FIG. 1 being an example of such an indication.

User interface 132 illustrates a discussion view of a particular crime. That is, user interface 132 may include information that describes a particular crime and one or more discussion messages from users that provide information about the particular crime. For instance, user interface 132 includes crime element 134, and a set of one or more discussion elements 136A-136B ("discussion elements 136") which may be presented in any suitable way such as a list in FIG. 1. Any number of discussion elements 136 may be associated with a particular crime, and correspond to information submitted by users about the particular crime. As described in this disclosure, users may submit information (e.g., tips, comments, or any other content) about a crime that are descriptive of it, and such that the user is anonymous to other users and server application 130. In this way, system 100, using anonymization network 120 and user interface 132, may enable a user to provide information that the user would otherwise not feel safe sharing if user could be identified. Moreover, by providing a collaborative or social interface in which information about a particular crime is discussed (and with proximity information as further described herein), more information may be submitted by users which can be used to solve the particular crime, discourage future crimes, and/or improve the safety of the neighborhood or region around the crime.

As described above, user interface 132 includes crime element 134, which may be implemented as a graphical user interface element, such as a card that includes text, images or other suitable content. Crime element 134 (and discussion elements 136) may be based on data sent by server application 130 to user application 128B. For instance, server application 130 may receive an indication of user input to select the crime that corresponds to crime element 134. Server application 130 may send crime information that is populated by user application 128B into crime element 134. Server application 134 may also send discussion information that is populated by user application 128B into discussion elements 136.

Crime element 134 includes crime type 138 (e.g., "Assault") for the particular crime in the discussion view. Any number of crime types are possible including but not limited to: Arrest, Arson, Assault, Robbery, Shooting, Theft, Vandalism, People Trafficking, Drugs, Terrorism, Mass Gathering, Riot, or any other indication of a crime or event. Crime element 134 may include a law enforcement sponsor indicator (LEST) 140. LESI 140 may be a flag or other indicator that indicates a law enforcement agency or other source of authority has sponsored the crime in the discussion view. The source of authority may provide an indication of user input to server application 130 to indicate it is sponsoring the crime. By sponsoring the crime in the discussion view, the source of authority may evaluate the quality, usefulness, and/or value of discussion information provided by users and release a remittance for the crime (further described herein) to one or more users. For instance, if a source of authority determines that the information provided by a particular user was essential, helpful, or useful to solving a crime, the source of authority may release the remittance for the crime to the particular user in accordance with techniques of this disclosure.

Crime element 134 may include crime details 142. Crime details 142 may be any details descriptive of the particular crime in the discussion view of user interface 132. Crime details 142 may include but are not limited to: date of crime, time of crime, street address of crime, city of crime, state of crime, zip code of crime, neighborhood of crime, season of crime, or any other details that describe the crime in the discussion view. In some examples, crime element 134 may include discussion activity indicator 144. Discussion indicator 144 may indicate a level of discussion activity, for example over a period of time, for a particular crime. In some examples, the level of discussion activity may be the number of discussion messages generated by users over a period of time. In this respective, discussion indicator 144 may indicate a velocity of discussion messages generated by users, which may indicate a level of interest in a particular crime. In the example of FIG. 1, three chat bubble icons may have different respective sizes and one of the three chat bubble icons may be visually indicated as "active" (e.g., by color, opacity or any other visual indication) and the other two chat bubble icons may be indicated as "inactive". In the example of FIG. 1, the level of discussion activity is moderate as indicated by the middle-sized chat icon which is "active", while the "low" and "high" discussion activity chat icons are indicated as "inactive". Server application 130 may send data for each crime that indicates the level of discussion activity for the crime, which user application 128B may use to indicate which discussion activity chat icon is active and which others are inactive. Alternatively, other indicators of the level of discussion activity for a crime may be used, such as but not limited to: color, size, different icon appearance(s), or any other visual indication.

Crime element 134 may include bounty amount 147. As described in this disclosure, system 100 provides an anonymity platform for users to receive incognito remittances for information that improves the safety of a community. By providing techniques for anonymous communication and provisioning of incognito remittances for particularized crimes, system 100 enables the collection, dissemination, and compensation of information for solving particular crimes, discouraging future crimes, and/or improving the safety of the neighborhood or region around the crime. In this way, the integration of anonymization network 120 with user proximities to crimes and incognito payments for such users that provide valuable information relating to such crimes provides a system that enables the collection and use of such information that otherwise could not be obtained, shared, or used by anonymous users and sources of sources of authority to solve particular crimes, discourage future crimes, and/or improve the safety of the neighborhood or region around the crime.

Techniques of this disclosure enable one or more users to submit and associated a bounty for a crime. A bounty may be a sum of money or other compensation provided in exchange for information about a particular crime or particular event. The bounty may later be released as a remittance in response to a user input as an incognito remittance that is received by one or more users who have provided information relating to the particular crime or particular event. As described in this disclosure, to associate a bounty with a crime, user application 128B may output a bounty submit icon in a graphical user interface.

In FIG. 1, in response to a user input that selects bounty submit icon 149, user application 128B may output for display one or more user interfaces in which a user may submit payment information and/or a bounty amount for a particular crime. The payment information may indicate payment account information for a payment account of the user, such as a credit card account, bank account, blockchain payment account (e.g., BitCoin, Ethereum, etc.), online payment account (e.g., PayPal, Stripe, etc.), or any other type of payment account. The payment information may also include an amount (e.g., denominated in a particular current) of the bounty that the user assigns to the particular crime. The user may provide a user input that causes user application 128B to send the payment information to server application 130. Server application 130 may store data that associates the amount of the bounty with the crime. Server application 130 may send a message to payment server 126, which may cause a transfer of money or other compensation from a payment account of user 108B to a payment account associated with a service provider operating server application 130. For instance, the message may specify an account of user 108B, an account of the service provider operating server application 130, and/or a bounty amount for a particular crime. Payment server 126, which may represent one or more computing devices, may execute one or more transactions based on the message to transfer the money or other compensation from an account of user 108B to an account of the service provider operating server application 130. As described in this disclosure, the money or other compensation in the account of service provider operating server application 130 may be released and provided as an incognito remittance to one or more other users that provide information relating to the crime. In the example of FIG. 1, a user has provided $5,000 as a bounty 147 for the crime indicated by crime element 134. In some examples, bounty 147 indicates a sum of bounties from multiple different users that have provided money or other compensation in association with the crime for crime element 134.

As described herein, server application 130 may select an account identifier of the user. Server application 130 may generate a message that includes the account identifier of the user, an account identifier of an account controlled by an operator of a service provided by the at least one server computing device, and an amount of the remittance. In some examples, server application 130 may send the message to at least one remote computing device (e.g., payment server 126) that executes a transaction that transfers at least a portion of the amount of the remittance from the account controlled by the operator of server application 130 to an account associated with the account identifier of the user. In some examples, a portion of the amount of the remittance is denominated in a cryptocurrency and the account associated with the account identifier of the user is denominated in the cryptocurrency. In some examples, the at least one server computing device of data center 114, to perform at least one operation that provides the remittance to the user, determines a portion (e.g., fee) of the remittance amount based at least in part on the total amount of the remittance. The at least one server computing device may generate an amount of the remittance provided to a user based on the portion representing the fee. For instance the user may receive a remittance equal to the total remittance less a fee.

Crime element 134 may also include a favorite icon 151, which may indicate whether a user has flagged or specified the crime as a "favorite" or otherwise particular interest. Server application may store the indication that a crime is a favorite of a user, such that a user application may receive such favorite information in order to filter or otherwise sort crimes based on the favorite indication.

As described herein, server application 130, based at least in part on determining that a location from a set of locations of one of mobile computing devices is within a threshold distance of a location of a crime, generates a proximity indication that a user associated with the one of the mobile computing devices is proximate to the crime. In the example of FIG. 1, server application may include one or more threshold distances, such as threshold distances 152A and 152B. In some examples, the threshold distances may be hard-coded, user-defined, and/or machine-generated. Server application 130 may determine that a location of computing device 128A was within threshold distance 152A from a location of crime 112, and a time difference between the timestamp of the location of computing device 128A and timestamp of the location of crime 112 is less than a threshold time. Accordingly, server application 130 may generate a proximity indication that user 128A is proximate to crime 112.

A proximity indication may be any data that indicates a user is proximate to a crime. For instance a proximity indication may be an enumerated value, such as "close", "moderate", "far" or any other suitable enumerated value. In the example of FIG. 1, server application 130 may associate "close" proximity indication with a user, for a particular crime, that is within threshold distance 152A of crime 112, "moderate" proximity indication with a user that is within threshold distance 152B but outside of threshold distance 152A, and "far" proximity indication with a user that is outside of threshold distance 152B. In other examples, proximity indication may be a set of numerical values, which may be scores, distances, or any other values that indicate a distance relationship between a user and a crime. In some examples, a proximity indication may be one or more values that user application may use to indicate a distance relationship between a user and a crime. The proximity indication may indicate a degree or amount of physical distance between the user and the crime. The proximity indication may indicate a degree or amount of temporal distance between the timestamp of the crime and the timestamp of a user's location relative to the crime. As shown in FIG. 1, the user interface may contemporaneously include the descriptive data in association with the proximity indication and an amount of the remittance.

Server application 130, when sending discussion information to, for example, user application 128B, may associate a proximity indication with each discussion message generated by a user that is represented by a discussion element in user interface 132. For instance, user 108A may have been at a location within distance threshold 152A of crime 112 and within a time threshold of the timestamps of crime 112 and the timestamp of the location of user 108A. User 108A may have submitted discussion information via a user interface provided by user application 128A that is descriptive of crime 112. The discussion information may be text, images, videos, audio data, hyperlinks, or any other information descriptive of the crime. In the example of FIG. 1, discussion information 147 of discussion element 136A is text "The truck was red with license plate HTY-687 and is usually parked at 109643 New Castle Rd."

Discussion element 136A may also include proximity element 148. Proximity element 148 may be based on a proximity indication received from server application 130. For instance, the discussion message represented by discussion element 136A may be based on discussion information submitted by user 108A. The proximity indication may indicate that user 108A was proximate to (e.g., within distance threshold 152A of) crime 112. As shown in FIG. 1, proximity element 148 includes multiple concentric circles. Each concentric circle may represent whether a use is within a threshold distance of a crime. Since user 108A was within distance threshold 152A of crime 112, the innermost concentric circle corresponding to distance threshold 152A may be visually differentiated from the other concentric circles representing other distance thresholds. Visual differentiation of different distance thresholds may be indicated in any number of ways including color, opacity, size, texture or pattern, or any other visual differentiator. Although illustrated as concentric circles in FIG. 1, any other visual representation may be used, such as bars, lines, images, colors, or any other suitable visual differentiator that differentiates different distance thresholds.

Discussion element 136A may also user identification elements 150 that identify a user that submitted the discussion information. For instance, user identification element 150A is the user identifier of user 108A and user identification element 150B may be an image that corresponds to user 108A, such as an avatar or other image, which may be user-submitted or system generated. In some examples, discussion element 136A may include time information 152 that indicates when the discussion information was submitted by user 108A. Example time information may include time elapsed since discussion information was submitted to server application 130, time when discussion information was submitted to server application 130, and date when discussion information was submitted to server application 130.

Discussion element 136A may include discussion message scores 156A, 156B. Users may select discussion message score controls 154A or 154B to increment or decrement, respective, discussion message scores 156A, 156B. Discussion message scores 156A, 156B respective indicate positive and negative discussion message scores for the discussion information included in discussion element 136A. By enabling users to select discussion message score controls 154A or 154B, users may rank or identify discussion information that more accurately, relevant, and/or useful to solve the particular crime, discourage future crimes, and/or improve the safety of the neighborhood or region around the crime. User application 128B may receive discussion message scores 156A, 156B from application server 130 and may send indications of user input when discussion message score controls 154A or 154B are selected by user 108B. Server application 130 may send and receive discussion message scores to and from user applications 128.

Discussion element 136A may include reply element 157. Discussion elements 136 may include one or more threads nested below each parent discussion element. For instance discussion element 136A may be a parent discussion element and one or more users may reply to discussion element 136A, which may create one or more child discussion elements. To reply to discussion element 136A, a user may provide a user input to select reply element 157. User application 128A may update user interface 132 to display an input control in which a user can provide discussion information, which may be displayed in a child discussion element. In some examples, discussion element 136A may include a new discussion message element (not shown) that when selected updates user interface 134 to enable a user to input discussion information for inclusion in a new parent discussion element. In this way, users may reply to discussion information in parent discussion elements and/or child discussion elements.

In the example of FIG. 1, user 108B may be a source of authority (e.g., law enforcement agency, government agency, or other entity of the public trust), although in other examples user 108B may not be a source of authority. User 108B may determine that discussion information 147 provided by user 108A was essential, helpful, or useful to solving crime 112. Accordingly, user 108B may provide an indication of user input to display a release user interface (not shown) for releasing or providing a remittance to user 102A that corresponds to the bounty for crime 112. In some examples, the release user interface (e.g., in FIG. 13) may enable user 108B to distribute the total amount of the bounty to one or more users as one or more remittance. In the example of FIG. 1, user 108B may provide an indication of user input that releases 100% of the $5,000 bounty as a remittance to user 102A for discussion information 147.

To release the $5,000 bounty as a remittance to user 102A, user application 128B sends a message to server application 130 that indicates one or more of: a user identifier of user 108B, an indication to release a remittance to user 108A, a proportion or percentage of the bounty that will be released as a remittance to user 108A, and an identifier of the crime and/or bounty, and any other suitable information for providing the remittance to user 108A. Server application 130 may receive the message.

In some examples, if server application 130 determines that user 108A has payment information for an account for receiving payment stored at server application 130, server application 130 sends a message to payment server 126, which may cause a transfer of money or other compensation from a payment account of the service provider operating server application 130 to a payment account associated with user 108A. For instance, the message may specify an account of user 108A, an account of the service provider operating server application 130, and/or a remittance amount. Payment server 126, which may represent one or more computing devices, may execute one or more transactions based on the message to transfer the money or other compensation from an account of the service provider operating server application 130 to the account of user 108A. As described in this disclosure, the money or other compensation in the account of service provider operating server application 130 may be released and provided as an incognito remittance (or non-incognito remittance) to one or more other users that provide information relating to the crime. In the example of FIG. 1, user 108A receives a $5,000 remittance for providing discussion information 147 for crime 112. In this way, server application 130, in response to receiving, using anonymization network 120, descriptive data generated by user 108A that is descriptive of crime 112, sends the descriptive data to other mobile computing devices such as 110B that is associated with user 108B, and provides the remittance to user 108A in response to receiving, from mobile computing device 110A that outputs a user interface in which the descriptive data (e.g., discussion information 147) is associated with proximity indication (e.g., proximity element 148 based on a proximity indication), an indication to release the remittance provided by user 108B. Further techniques are described with respect to the following figures.

Figure 2:
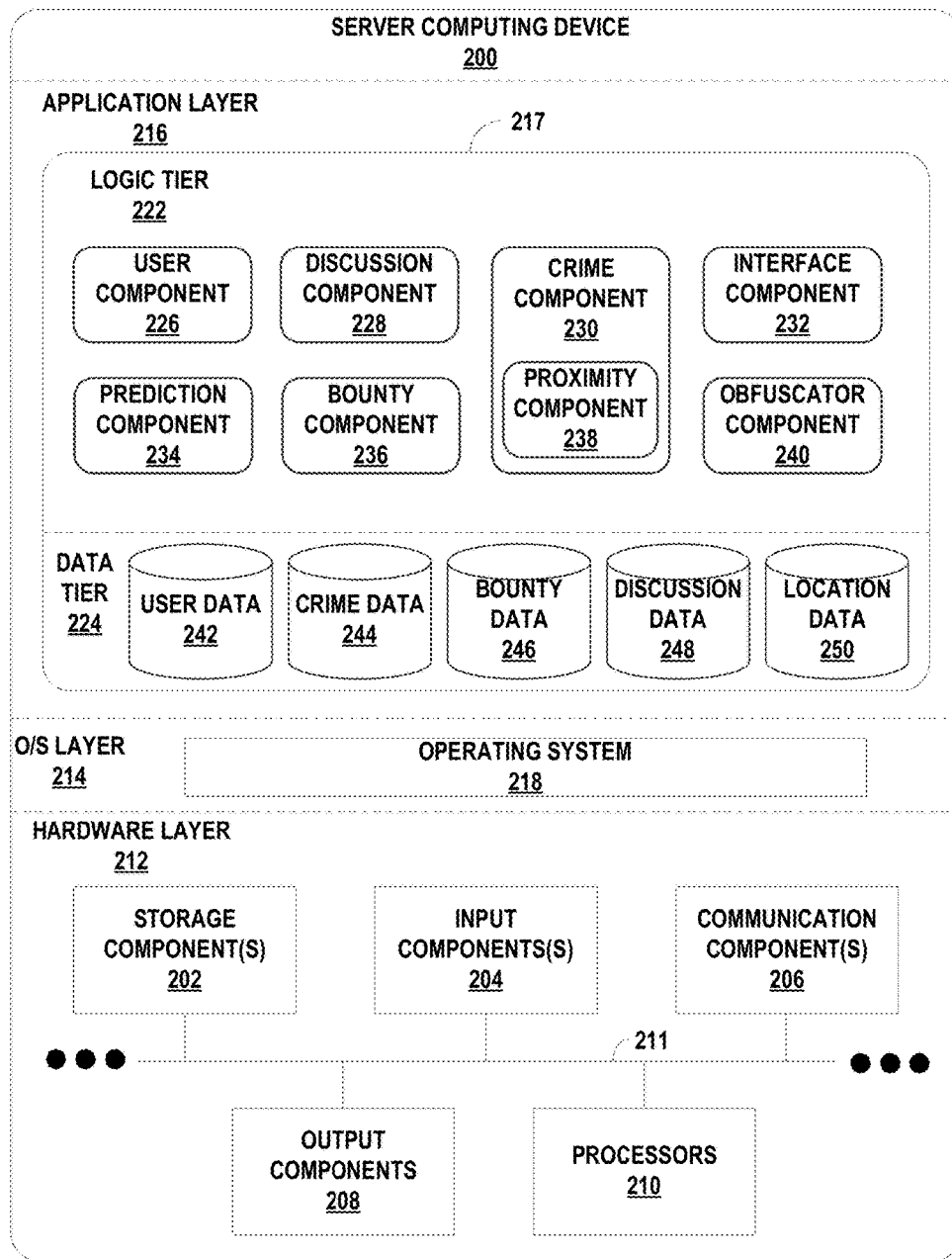
FIG. 2 is a block diagram illustrating further details of a server computing device shown in FIG. 1, in accordance with one or more aspects of the present disclosure.

FIG. 2 is a block diagram illustrating further details of a server computing device shown in FIG. 1, in accordance with one or more aspects of the present disclosure. Server computing device 200 is an example of server computing device 116A, as illustrated and described in FIG. 1. FIG. 2 illustrates only one particular example of server computing device 200, and many other examples of server computing device 200 may be used in other instances and may include a subset of the components included in example server computing device 200 or may include additional components not shown in FIG. 2. In some examples, multiple instances of server computing device 200 may interoperate together, such as in a data center or distributed computing environment, to provide the functionality of server computing device 200 described in this disclosure.

As shown in the example of FIG. 2, server computing device 200 includes user component 226, discussion component 228, crime component 230, interface component 232, prediction component 234, bounty component 236, proximity component 238, obfuscator component 240, user data 242, crime data 244, bounty data 246, discussion data 248, location data 250, operating system 218, one or more storage components 202, one or more input components 204, one or more communication components 206, one or more output components 208, one or more processors 210, and one or more communication channels 211.

Communication channels 211 may interconnect one or more devices and/or components of server computing device 200 for inter-component communications (physically, communicatively, and/or operatively). In some examples, communication channels 211 may include a system bus, a network connection, an inter-process communication data structure, or any other method for communicating data.

One or more input components 204 of server computing device 200 may generate or receive data indicating input from one or more humans and/or devices. Example types of input include tactile, audio, and visual input, although any suitable types of input may be generated or received by input components 204. In one example, input components 204 include a presence-sensitive display, touch-sensitive screen, mouse, keyboard, voice responsive system, video camera, microphone, or any other type of device for detecting input from a human or device.

One or more output components 208 of server computing device 200 may generate output. Examples of output are tactile, audio, and video output. Output components 208 of server computing device 200 may include a presence-sensitive display, sound card, video graphics adapter card, speaker, cathode ray tube (CRT) monitor, liquid crystal display (LCD), or any other type of device for generating output to a human or machine.

One or more communication components 206 may allow server computing device 200 to communicate with external devices and/or systems. In some examples, communication may be via one or more wired and/or wireless networks, via one or more communication channels that do not include a network, and/or a combination of such networks and communication channels. Communication components 206 may transmit and/or receive network signals being transmitted and received other devices and/or systems connected to one or more networks. Examples of communication components 206 include network interface cards (e.g. such as an Ethernet card), optical transceivers, radio frequency transceivers, GPS receivers, or any other type of device that can send and/or receive information. Other examples of communication components 208 may include long and short wave radios, cellular data radios, wireless network radios, as well as universal serial bus (USB) controllers, Bluetooth controllers and any other suitable components for communication.

One or more storage components 202 of server computing device 200 may store information or instructions that server computing device 200 processes during operation of server computing device 200. For example, storage components 202 may store data that modules or components may access during execution at server computing device 200. In some examples, storage components 202 are temporary memories, meaning that a primary purpose of storage components 202 is not long-term storage.

Storage components 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 202 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage components 202, in some examples, include one or more computer-readable storage media. In some examples, storage components 202 represent non-transitory computer readable storage medium that store instructions later executed by one or more processors 210 during operation of server computing device 200. For example, storage components 202 may store program instructions and/or information (e.g., data) associated with components included application layer 216 of server computing device 200. Application layer 216 may include one or more applications such as server application 217, which may be an example of server application 130 in FIG. 1. Server application 217 may include logic tier 222 with one or more components that perform one or more operations and data tier 224 with one or more datastores or other configurations of data.

One or more processors 210 may implement functionality and/or execute instructions within server computing device 200. For example, processors 210 on server computing device 200 may receive and execute instructions stored by storage components 202 that execute the functionality of components included in application layer 216. The instructions executed by processors 210 may cause server computing device 200 to read/write/etc. data that is stored within storage components 202. Processors 210 may execute instructions of components included in application layer 216 to cause server computing device 200 to perform the operations described in this disclosure. That is, components in application layer 216 may be operable by processors 210 to perform various operations, actions, and/or functions of server computing device 200 in accordance with one or more aspects of the present disclosure.

As shown in FIG. 2, server computing device 200 includes user component 226. User component 226 may receive one or more types of information via anonymization network 120 from a user application (e.g., user application 128B), which user component 226 may use to generate a unique user identifier for user 108B, which is stored in user data 242 and used by server application 217 in accordance with techniques of this disclosure. As described in FIG. 1, the one or more types of information received by user component 226 do not personally identify and cannot personally identify mobile computing device 110B, user application 128B or user 108B. For instance, the one or more types of information may be a random number, a timestamp, a hash value, or any other type of information. User component 226 may apply one or more functions or other operations to the one or more types of information received from mobile computing device 128B to generate a user identifier for user 108B. For instance, user component 226 may apply a hash function, random number generation function, or any other function to the one or more types of information to generate the user identifier for user 108B. The user identifier may be stored by user component 226 in user data 242. Accordingly, user component 226 may generate, store, and use the unique user identifier that is associated with user 108B, use application 128B, and/or mobile computing device 110B for purposes of distinguishing between different unique users and/or devices, but cannot be used to personally identify or physically locate user 108B, user application 128B, and/or mobile computing device 110B. In this way, user component 226 may maintain identifiers for different unique users and/or mobile computing device without maintaining information that can be used to personally identify and/or physically locate users or mobile computing devices that use services provided by server application 217.

Server application 217 may include discussion component 228. Discussion component 228 may receive requests from user applications to store discussion information generated by users into discussion data 248. Discussion data 248 may include discussion information such as text, images, videos, audio data, or any other information descriptive of a crime. In some examples, discussion data 248 includes relationships between parent and child discussion messages. Discussion component 228 may provide to a user application a set of one or more discussion messages with discussion information stored in discussion data 248 for a crime. The discussion information may be output for display in discussion elements as shown in FIG. 1. The discussion messages may include but are not limited to proximity indications, discussion message scores, and other metadata about the discussion messages such as date and time information, author information for the discussion information and any other suitable information.

Server application 217 may include crime component 230. Crime component 230 may receive crime data 244 from one or more other computing devices and/or otherwise store crime data 244. In some examples, crime component 230 may send crime data 244 to one or more mobile computing devices. Crime component 230 may include proximity component 238. Proximity component 238 may determine a set of respective distances between each crime of a set of crimes and each instance of location data from a set of location data. For example, proximity component 238 may determine a set of respective distances between each crime of a set of crimes and each instance of location data 250 from a set of location data that was sent by a user application to server application 217. Server application 217 may determine the respective distances for those instances of location data 250 having timestamps which, when compared to the timestamps of respective crimes in the set of crimes, have a time duration that is less than or equal to a time threshold. Proximity component 238 may determine respective distances for those instances of location data 250 having timestamps which, when compared to the timestamps of respective crimes in the set of crimes, are less than a threshold time between the timestamp of respective crime and the respective instance of location data. In this way, proximity component 238 may determine the respective distances between a user mobile computing device and crime when the mobile computing device was temporally proximate to a crime.

Server application 217 may include interface component 232. In some examples, interface component 232 may provide one or more endpoints that provide data to other computing devices such as mobile computing devices. For instance, interface component 232 may provide one or more Representation State Transfer (REST) interfaces or "endpoints" which mobile application may call to send and/or receive information with one or more components of logic dirt 222.

Server application 217 may include prediction component 234. Prediction component is further described in FIG. 4. In some examples, prediction component 234 may receive a crime profile that includes a set of variables that describe or otherwise characterize a particular crime. Prediction component 234 may generate a bounty profile, which may indicate a bounty amount, bounty time, and/or other characteristics of a bounty, where the bounty profile has a likelihood or score that satisfies a likelihood threshold, and the likelihood threshold indicates that the bounty profile, if applied to the crime, will produce information from one or more users that solves the particular crime, discourages future crime, and/or improves the safety of the neighborhood or region around the crime.

Server application 217 may include obfuscator component 240. Obfuscator component 240 may reduce or prevent doxing of individuals in text provided to server application 217, such as in a discussion message, crime data, or any other information. In some examples, doxing may mean broadcasting private or identifiable information (especially personally identifiable information) about an individual or organization in a publicly viewable way. Obfuscator component 240 may implement one or more techniques to reduce or prevent doxing of individuals.

As described herein, obfuscator component 240 may determine whether, for example, text in a discussion message, includes private or identifiable information about an individual or organization that may dox the individual. As an example, obfuscator component 240 may perform a lookup of text submitted by a user against a set of words that represent person names, although any set of words may be used. In some examples, obfuscator component 240 may determine a likelihood or score that text (e.g., a word or set of words) includes private or identifiable information about an individual or organization that may dox the individual, and if the likelihood or score satisfies a threshold (e.g., greater than or equal to), then obfuscator component 240 may determine that the text includes private or identifiable information about an individual or organization that may dox the individual.

In some examples, if obfuscator component 240 determines that the text includes private or identifiable information about an individual or organization that may dox the individual, obfuscator component 240 may associate a label with the word (e.g., name), such that when displayed at a mobile computing device, the text with the label is obfuscated using one or more techniques. Such techniques may include obfuscating each vowel, every n-th character of the word, or the entire word to name only a few examples. In some examples, anti-doxing techniques may be applied to images, audio, and/or video content uploaded by users as well. In some examples, natural language processing may be applied against user submitted text to determine whether user submitted text is making an allegation against a particular person or not making an allegation against a particular person. If an allegation is detected, then obfuscator component 240 may obfuscate text, audio, (e.g., obfuscate the sound), and/or images or video (e.g., obfuscate the visual content).

Obfuscator component 240 may implement one or more natural language processing techniques, such as sentiment analysis and named entity extraction either alone or in combination, to identify a named entity (e.g., a person) and determine whether the named entity is characterized by an accusatory or negative modifier, such that the combination of named entity and modifier would constitute defamation of the named entity. In some examples, obfuscator component 240 may generate a confidence score or probability that the a portion of content would constitute defamation of the named entity, based at least in part on whether the named entity is characterized by an accusatory or negative modifier. Example techniques which may be implemented by obfuscator component 240 include, but are not limited to the following, each of which is hereby incorporated by reference herein in its entirety: The Detection and Analysis of Bi-polar Phrases and Polarity Conflicts, http://www.zora.uzh.ch/id/eprint/99629/1/n1pcs2014.pdf, (2014); A Pattern Dictionary for Natural Language Processing, https://www.cairn.info/revue-francaise-de-linguistique-appliquee-2005-2-page-63.htm (2005); Sentiment analysis: capturing favorability using natural language processing, https://pdfs.semanticscholar.org/c0ed/c993eaaf8850b3d599e7f7e11187dc4c76c1.pdf (2003); The Stanford CoreNLP Natural Language Processing Toolkit, https://nlp.stanford.edu/pubs/StanfordCoreNlp2014.pdf (2014); Techniques and Applications for Sentiment Analysis, https://cacm.acm.org/magazines/2013/4/162501-techniques-and-applications-for-sentiment-analysis/abstract (2013).

In some examples, obfuscator component 240 may identify, based at least in part on application of natural language processing to descriptive data, an accusation in a semantic meaning of the descriptive data. In some examples, an accusation may be a charge or claim that someone has done something. Examples of an accusation may include a charge or claim that a person committed an act, made a statement, or was associated with some event, to name only a few examples of accusations. In some examples, the charge or claim may associate the person with a wrongdoing or other undesirable act. Obfuscator component 240 may, in response to identification of the accusation, identify at least a portion of content in the descriptive data that corresponds to the accusation. For instance, using sentiment analysis, obfuscator component 240 may determine the sentiment of a set of text is an accusation or negative connotation, and using named entity extraction may determine that the accusation or negative connotation corresponds to, for example, a proper noun, name, or other identifier that was accused or disparaged. Obfuscator component 240 may perform at least one operation to obfuscate at least the portion of the content in the descriptive data. For instance, obfuscator component 240 may generate data that associates a label with the descriptive data or at least a portion of content in the descriptive data. In some examples obfuscator component 240 may modify at least the portion of the content in the descriptive data to change at least one of a character, pixel value, or sound of the descriptive data. For instance, obfuscator component 240 may select an area of interest in an image or video and alter the pixels to blur or otherwise obfuscate the area of interest (e.g., a face of person or other identifying feature). In some examples, obfuscator component 240 may select an area of interest in a sound recording and alter the sound values within the area of interest such that the sound in the area of interest is unintelligible. In some examples, obfuscator component 240 may identify an area of interest in text, such as a person name, address, telephone number, email address, or any other identifying information and obfuscate such text.

As described herein, in some examples data may be obfuscated for certain types or roles of users but not obfuscated or other types or roles of users. In some examples data may be obfuscated in certain types of user interfaces, e.g., user interface 900, but may not be obfuscated in other user interfaces, e.g., user interface 1200. In some examples, data may be obfuscated for users of one type or role in a user interface, but the data may not be obfuscated for users of a different type or role in the same user interface.

In some examples, a label may not be associated with the word (e.g., stored as metadata with the word), but the word or set of words may be obfuscated by obfuscator component 240 and stored as an obfuscated word in, e.g., discussion data 248. In some examples, certain user types or roles may be able to view non-obfuscated words that are obfuscated for a different types or roles. For examples, a special user (e.g., source of authority or law enforcement) may be assigned a user type or role in user data 242 with the user identifier that permits the source of authority user to view non-obfuscated words that are obfuscated for a different types or roles, while a non-special user may not view the obfuscated words. A user application executing at a mobile device as described in this disclosure may receive, from server application 217, obfuscated words based on different types or roles, or the user application may determine based on a label associated with a words that user application will obfuscate the word before it is displayed in the user interface. In some examples, obfuscator component 240 may encrypt or otherwise encode obfuscated words or text (e.g., with a key in some examples), such that only certain user types or roles using a user application may decrypt or decode the obfuscated words or text to view the non-obfuscated words or text. In any case, obfuscator component 240 may implement one or more techniques to prevent or limit viewing of private or identifiable information about an individual or organization that may dox the individual, which may have been submitted by one or more users of server application 217.

In some examples, bounty component 236 may charge a fee on a bounty that is released. For example, bounty component 236 may reduce the amount of payment released to a particular user by deducting a fee, which may be a percentage or a fixed amount. An accounting of the fee may be stored in bounty data 246. In some examples, each fee may be variable based on one or more factors that are determined by bounty component 236. Example factors may be bounty amount, number of users receiving a proportion of the bounty, crime type, or any other metric or characteristic described in this disclosure. In some examples, bounty component 236 may charge a fee for each bounty and/or crime/event that is posted or otherwise created. In some examples, the fee that is changed in any case may be based at least in part on the type or role of the posting user.

In some examples, to protect the anonymity of a user, bounty component 236 may automatically delete information that indicates a release of a remittance to a user after the remittance has been transfer to the user. For instance, in response to a remittance being selected for release to a user, bounty component 236 may store data that defines an association between a transaction identifier, an identifier of user that will receive the remittance, and an amount of the remittance. In some examples, bounty component 236, in response to the remittance being transferred to an account of the user and from an account controlled by an operator of a service provided by the at least one server computing device, may automatically destroy the data that defines the association between the transaction identifier, the identifier of user, and the amount of the remittance, such that the data that defines the association cannot be reconstructed. Any suitable techniques known in the art may be used to destroy the data such that the data that defines the association cannot be reconstructed.

In some examples, any user may create a crime or other event that is stored in crime data 244. For instance, mobile computing device 110B may output for display a graphical user interface in which a user may define details about a crime, event, or other occurrence. Mobile computing device 110B may send the data to server computing device 200. Crime component 230 may store the details of the crime, event or other occurrence in crime data 244. In some examples, when crimes, events, or occurrences are output for display at other mobile computing devices of users, the crime, event, or other occurrence and its details may be output for display in a manner that is the same or similar as described with respect to crimes in FIG. 1.

In some examples, a source of authority may not sponsor a bounty. In such examples, a first user may initially create a crime, event, or other occurrence that is stored in crime data 244. The first user may associate a remittance with the crime, event, or other occurrence, which is stored in bounty data 246. Bounty component 236 may transfer the amount of the remittance from an account of the first user to an account of an operator of server application 217. A second user may, in response to viewing information about the crime, event, or occurrence, may submit descriptive data that the first user determines to be relevant to the crime, event, or occurrence. In some examples, the first user may provide a user input that causes bounty component 236 to release the remittance to the second user, as described in this disclosure. In some examples, the second user may provide an indication of user input that rates the first user, which is stored in one or more of user data 242 and/or bounty data 246. For instance, a rating may include a range of numeric or discrete values from low to high. If the first user does not release the remittance or releases a portion of the remittance that in either case is unsatisfactory to the second user for the quality of information provided, then the second user may provide a corresponding rating. In some examples, the first user may also rate the second user.

In some examples, the remittance may not be paid immediately to the second user or returned to the first user. If, for example, the second user provides a rating of the first user below a threshold rating for either a portion of remittance released to the second user or the remittance not being released at all (although the second user provided information), then the remittance may be temporarily maintained in an account controlled by the operator of server application 217. In some examples, the second user may provide feedback or explanation to the operator of server application 217 for the basis of the rating (e.g., the information provided by the second user was determined or validated to have been relevant, useful, valuable in response to the crime, event, or occurrence described by the first user). In some examples, the operator of server application 217 may release a portion of the remittance to the second user based on an evaluation of the information provided, remittance amount, or any other relevant information. In some examples, the operator of server application 217 may release a first portion back to the first user, a second portion to the second user, and/or a third portion of the remittance may be retained by the operator of server application 217.

In some examples, a remittance submitted as a bounty by a user may increase in amount over time. For instance, a user may authorize an initial bounty amount and a maximum bounty amount that is larger than the initial bounty amount. The user may specify a time duration for the bounty to remain active in association with a crime, event, or occurrence, such that when active the crime, event, or occurrence is viewable on a map. In some examples, the bounty amount may increase linearly or non-linearly over the time duration to the maximum bounty amount. Once the maximum bounty amount is reached or at some defined time after the maximum bounty amount is reach, the crime, event, or occurrence may be removed or changed to inactive, such that it is no longer viewable by users.

Figure 3:
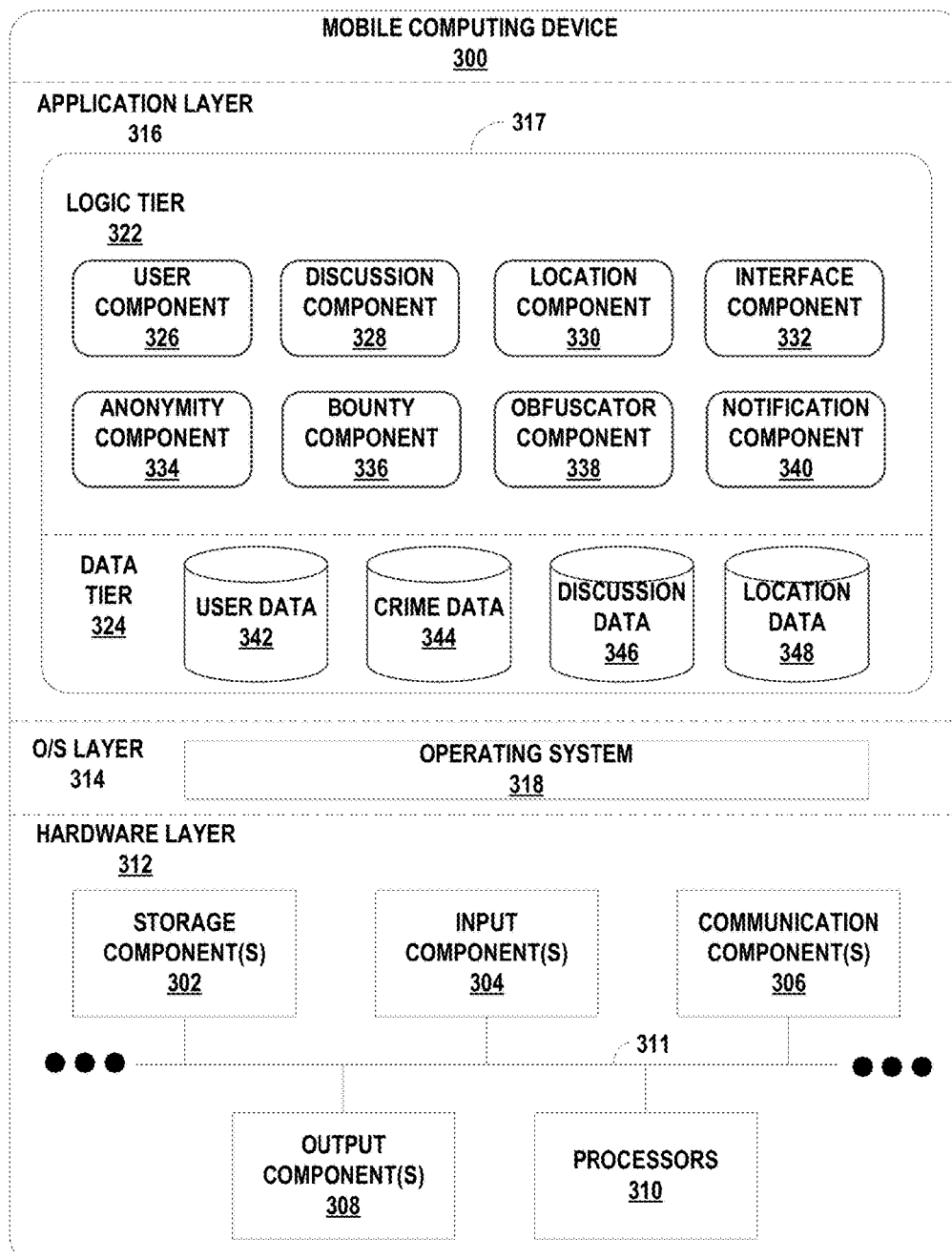
FIG. 3 is a block diagram illustrating further details of a mobile computing device shown in FIG. 1, in accordance with one or more aspects of the present disclosure.

FIG. 3 is a block diagram illustrating further details of a mobile computing device shown in FIG. 1, in accordance with one or more aspects of the present disclosure. Mobile computing device 300 is an example of mobile computing device 110B, as illustrated and described in FIG. 1. FIG. 3 illustrates only one particular example of mobile computing device 110B, and many other examples of mobile computing device 110B may be used in other instances and may include a subset of the components included in example mobile computing device 110B or may include additional components not shown in FIG. 3. In some examples, multiple instances of mobile computing device 110B may interoperate together (e.g., smartphone, smartwatch, server, etc.) to provide the functionality of mobile computing device 110B described in this disclosure.

As shown in the example of FIG. 2, server computing device 200 includes user component 326, discussion component 328, location component 330, interface component 332, anonymity component 334, bounty component 336, obfuscator component 338, notification component 340, user data 342, crime data 344, discussion data 346, location data 348, operating system 318, one or more storage components 302, one or more input components 304, one or more communication components 306, one or more output components 308, one or more processors 310, and one or more communication channels 311.

Communication channels 311 may interconnect one or more devices and/or components of mobile computing device 300 for inter-component communications (physically, communicatively, and/or operatively). In some examples, communication channels 311 may include a system bus, a network connection, an inter-process communication data structure, or any other method for communicating data.

One or more input components 304 of mobile computing device 300 may generate or receive data indicating input from one or more humans and/or devices. Example types of input include tactile, audio, and visual input, although any suitable types of input may be generated or received by input components 304. In one example, input components 304 include a presence-sensitive display, touch-sensitive screen, mouse, keyboard, voice responsive system, video camera, microphone, or any other type of device for detecting input from a human or device.

One or more output components 308 of mobile computing device 300 may generate output. Examples of output are tactile, audio, and video output. Output components 308 of mobile computing device 300 may include a presence-sensitive display, sound card, video graphics adapter card, speaker, cathode ray tube (CRT) monitor, liquid crystal display (LCD), or any other type of device for generating output to a human or machine.

One or more communication components 306 may allow mobile computing device 300 to communicate with external devices and/or systems. In some examples, communication may be via one or more wired and/or wireless networks, via one or more communication channels that do not include a network, and/or a combination of such networks and communication channels. Communication components 306 may transmit and/or receive network signals being transmitted and received other devices and/or systems connected to one or more networks. Examples of communication components 306 include network interface cards (e.g. such as an Ethernet card), optical transceivers, radio frequency transceivers, GPS receivers, or any other type of device that can send and/or receive information. Other examples of communication components 306 may include long and short wave radios, cellular data radios, wireless network radios, as well as universal serial bus (USB) controllers, Bluetooth controllers and any other suitable components for communication.

One or more storage components 302 of mobile computing device 300 may store information or instructions that mobile computing device 300 processes during operation of mobile computing device 300. For example, storage components 302 may store data that modules or components may access during execution at mobile computing device 300. In some examples, storage components 302 are temporary memories, meaning that a primary purpose of storage components 302 is not long-term storage.

Storage components 302 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 302 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage components 302, in some examples, include one or more computer-readable storage media. In some examples, storage components 302 represent non-transitory computer readable storage medium that store instructions later executed by one or more processors 310 during operation of mobile computing device 300. For example, storage components 302 may store program instructions and/or information (e.g., data) associated with components included application layer 316 of mobile computing device 300. Application layer 316 may include one or more applications such as user application 317, which may be an example of user application 128B in FIG. 1. User application 317 may include logic tier 322 with one or more components that perform one or more operations and data tier 324 with one or more datastores or other configurations of data.

One or more processors 310 may implement functionality and/or execute instructions within mobile computing device. For example, processors 310 on mobile computing device 300 may receive and execute instructions stored by storage components 302 that execute the functionality of components included in application layer 316. The instructions executed by processors 310 may cause mobile computing device 300 to read/write/etc. data that is stored within storage components 302. Processors 310 may execute instructions of components included in application layer 316 to cause mobile computing device 300 to perform the operations described in this disclosure. That is, components in application layer 316 may be operable by processors 310 to perform various operations, actions, and/or functions of mobile computing device 300 in accordance with one or more aspects of the present disclosure.

As shown in FIG. 3, mobile computing device 300 includes user component 326. User component 326 may send one or more types of information via anonymization network 120 from a user application (e.g., user application 128B), which server application 217 may use to generate a unique user identifier for user 108B, which is stored in user data 242 and used by server application 217 in accordance with techniques of this disclosure. The various types of information are described in FIG. 2. User component 326 may receive a unique user identifier for user 108B from server application 217 at the time of user identifier creation, and store the user identifier as user data 342. In some examples, user component 326 may encrypt user data 342. In some examples, an authentication credential may be associated with the user identifier and stored in user data 342. In some examples, server application 217 may only process requests that include a valid combination of user identifier and authentication credential.

User application 317 may include discussion component 328. Discussion component 328 may generate one or more user interfaces in which user 108B may submit discussion information and/or view discussion information. Discussion information and any metadata for discussion information may be stored as discussion data 346. In some examples, discussion component 328 may generate and/or display discussion data 346 that corresponds to discussion information such as metadata about the discussion information, including but not limited to discussion message scores, proximity elements and any other data relating to discussion information or a discussion message.

User application 317 may include location component 330. Location component 330 may generate location data 348 according to one or more techniques described in FIG. 1. In some examples, location component 330 sends location data 348 to server application 217 for processing in accordance with one or more techniques of this disclosure. In some examples, location component 330 may receive location data from operation system 318 and/or a runtime environment executing at mobile computing device 300.

User application 317 may include interface component 332. Interface component 332 may include one or more libraries and/or runtime components that user application 317 may use to send and receive data with other computing devices such as server application 217.

User application 317 may include anonymity component 334. Anonymity component 334 may implement one or more specifications or functions that anonymize data sent from user application 317 and/or mobile computing device 300 to server computing device 200. For instance, anonymity component 334 may implement or other operate in accordance with the Tor Protocol Specification as described in FIG. 1. Network communications initiated by user application 317 to server application 217 may be anonymized by anonymity component 334, which may communicate with one or more relays in an anonymization network. In other examples, anonymity component 334 may implement any other techniques that may anonymize the source device from the destination device, as described in FIG. 1.

User application 317 may include bounty component 336. Bounty component 336 may generate one or more user interfaces in which user 108B may submit payments for bounties and/or receive remittances associated with bounties. For example, bounty component 336 may enable a user to provide input that specifies a bounty amount for a particular crime, account information, and any other information described in FIG. 1. Bounty component 336 may send such data to server application 217, which may associate the bounty payment with a particular bounty for a crime. Bounty component 336 may enable a user to provide input that enables the user to receive a bounty payment as a remittance when released by server application 217. In some examples, bounty component 336 may enable the user to receive payment through any number of different payment processors (e.g., PayPal, Western Union, Batchex, GiftBit, BitCoin, Ethereum, Square, Google Wallet, Apple Pay, etc.).

User application 317 may include obfuscator component 338. Obfuscator component 338 may reduce or prevent doxing of individuals in text provided to user application 317, such as in a discussion message, crime data, or any other information. In some examples, doxing may mean broadcasting private or identifiable information (especially personally identifiable information) about an individual or organization in a publicly viewable way. Obfuscator component 338 may implement one or more techniques to reduce or prevent doxing of individuals.

As described herein, obfuscator component 338 may determine whether, for example, text in a discussion message, includes private or identifiable information about an individual or organization that may dox the individual. As an example, obfuscator component 338 may perform a lookup of text submitted by a user against a set of words that represent person names, although any set of words may be used. In some examples, obfuscator component 338 may determine a likelihood or score that text (e.g., a word or set of words) includes private or identifiable information about an individual or organization that may dox the individual, and if the likelihood or score satisfies a threshold (e.g., greater than or equal to), then obfuscator component 338 may determine that the text includes private or identifiable information about an individual or organization that may dox the individual.

In some examples, if obfuscator component 338 determines that the text includes private or identifiable information about an individual or organization that may dox the individual, obfuscator component 338 may associate a label with the word (e.g., name), such that when displayed at a mobile computing device, the text with the label is obfuscated using one or more techniques. Such techniques may include obfuscating each vowel, every n-th character of the word, or the entire word to name only a few examples.

In some examples, a label may not be associated with the word (e.g., stored as metadata with the word), but the word or set of words may be obfuscated by obfuscator component 338 and stored as an obfuscated word in, e.g., discussion data 346. In some examples, certain user types or roles may be able to view non-obfuscated words that are obfuscated for a different types or roles. For examples, a special user (e.g., source of authority or law enforcement) may be assigned a user type or role in user data 342 with the user identifier that permits the source of authority user to view non-obfuscated words that are obfuscated for a different types or roles, while a non-special user may not view the obfuscated words. A user application executing at a mobile device as described in this disclosure may receive, from server application 217, obfuscated words based on different types or roles, or the user application may determine based on a label associated with a words that user application will obfuscate the word before it is displayed in the user interface. In some examples, server application 217 may encrypt or otherwise encode obfuscated words or text (e.g., with a key in some examples), such that only certain user types or roles may cause obfuscator component 338 to decrypt or decode the obfuscated words or text to view the non-obfuscated words or text. In any case, obfuscator component 338 may implement one or more techniques to prevent or limit viewing of private or identifiable information about an individual or organization that may dox the individual, which may have been submitted by one or more users.

User application may include notification component 340. In some examples, notification component 340 may receive data from server application 217, which notification component 340 causes operation system 318 and/or one or more runtime components to generate a notification with information. Notifications may include audio, haptic, and/or visual output at the mobile computing device. Example notifications may include but are not limited to: a user receives a private message, a user receives a bounty payment as a remittance, a bounty payment is returned to the user, a discussion message generated by the user is replied to be another user, activity occurs on a crime or bounty marked as a favorite by the user, a new crime occurs and the user is within a threshold distance of the crime and within a threshold time of when the crime occurred, or any other event occurs for which a notification is generated.

Figure 4:
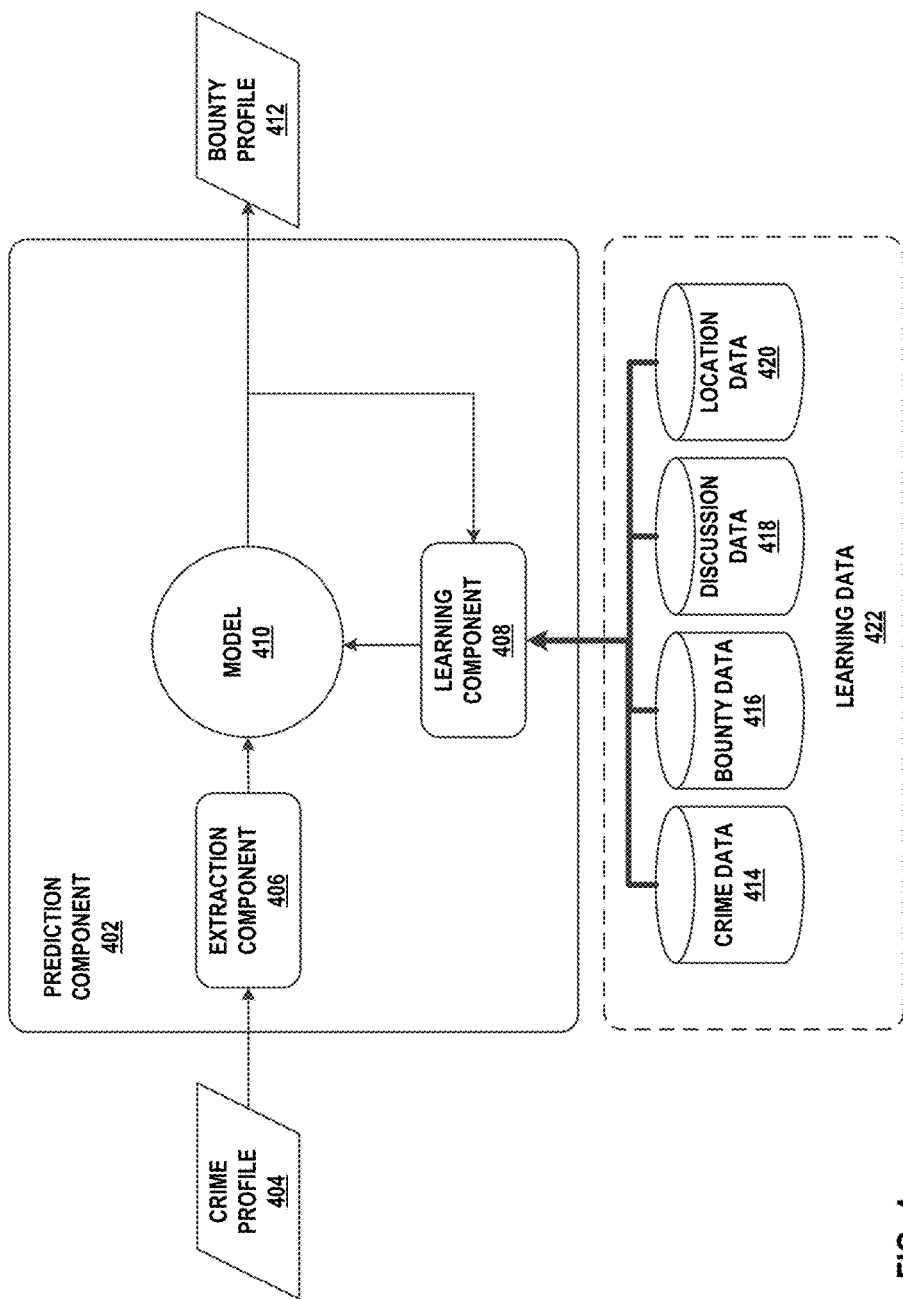
FIG. 4 is a conceptual diagram of a prediction component, in accordance with techniques of this disclosure.

FIG. 4 is a conceptual diagram of a prediction component 402 in accordance with techniques of this disclosure. Prediction component 402 may be an example of prediction component 234 as shown in FIG. 2. In some examples, prediction component 402 may receive a crime profile 404. A crime profile may include any data that is descriptive of a crime or that relates to a crime. Prediction component 402 may generate a bounty profile 412, which may indicate a bounty amount, bounty time, and/or other characteristics of a bounty, where bounty profile 412 may include a likelihood value that may satisfy a likelihood threshold, and the likelihood threshold indicates that the bounty profile, if applied to the crime, may produce information from one or more users that solves the particular crime, discourages future crime, and/or improves the safety of the neighborhood or region around the crime. In this way, prediction component 402 may output for display, for a particular crime, one or more bounty amounts that may produce information from one or more users that solves the particular crime, discourages future crime, and/or improves the safety of the neighborhood or region around the crime.

As shown in FIG. 4, prediction component 402 may include extraction component 406, model 410, and learning component 408. Extraction component 406 may extract features from a crime profile 404, which extraction component 406 may configure into a feature vector. In some examples, model 410 (e.g., a bounty model) may be trained by learning component 408 using supervised and/or reinforcement learning techniques. Model 410 may be implemented using any number of models for supervised and/or reinforcement learning, such as but not limited to a decision tree, artificial neural networks, support vector machine, naïve Bayes network, or k-nearest neighbor model.

In some examples, learning component 408 may train model 410 based on a training set. The training set may include a set of data structured as feature vectors (or other suitable form), where each feature in the feature vector represents a characteristic of a bounty, crime to which the bounty is associated, or any other information associated with a bounty. The feature vector may, for example, include a first feature that indicates a bounty amount and a second feature whether the bounty was released as a remittance. Features in the feature vector and/or in a crime profile may include but are not limited to: crime type, crime location, crime time, discussion velocity, total discussion messages, text from discussion information, number of users at each distance threshold replying and/or submitting discussion information, payment type, discussion message scores (total score increases, total score decreases, net score, velocity of score increases and/or decreases, or any other result from one or more functions applied to discussion message scores), amount of obfuscated words, whether the bounty is sponsored by a source of authority, or any other information described in this disclosure or that otherwise may be used to predict whether a bounty amount will produce information from one or more users that solves the particular crime, discourages future crime, and/or improves the safety of the neighborhood or region around the crime. Training data may be selected from learning data 422, which includes crime data 414, bounty data 416, discussion data 418, and/or location data 420, which may be examples of like-named data in FIG. 2. Other data may also be used such as user data.

By training model 410 based on training data, model 410 may be configured by learning component 408 to generate a set of one or more bounty amounts that, for a particular crime profile, are likely to result in the release of a bounty as a remittance in response to information produced from one or more users that solves the particular crime, discourages future crime, and/or improves the safety of the neighborhood or region around the crime. In some examples, each bounty amount from the set of bounty amounts may be associated with a corresponding likelihood value, such as a probability or a score. In some examples, bounty profile 412 includes the set of one or more bounty amounts and/or respective likelihood values for the bounty amounts. In some examples, a crime profile 404 may be submitted to prediction component 402, and trained model 410 may output a bounty profile 412, which can be output for display. In some examples, bounty profile 412 is output for display in a graphical user interface to indicate the amount of a bounty that, for a particular crime profile, are likely to result in the release of a bounty as a remittance in response to information produced from one or more users that solves the particular crime, discourages future crime, and/or improves the safety of the neighborhood or region around the crime. In some examples prediction component 402 may select the highest likelihood value or a set of likelihood values that satisfy a threshold (e.g., greater than or equal to). In some examples, the output of model 410, such as bounty profile 412 may be used by learning component 408 to train model 410 while prediction operation 402 is in operation with one or users.

In some examples, predication component 402 may receive a crime profile 404 comprising data that characterizes the crime. Prediction component 402 may apply the data of the crime profile that characterizes the crime to a bounty model 410 that predicts a likelihood that a remittance amount will produce information about the crime from one or more users. Prediction component 402 may perform at least one operation based at least in part on the likelihood that the remittance amount will produce information about the crime from one or more users. In some examples, prediction component 402 may select a set of training instances, each training instance comprising an association between a remittance amount and data that characterizes a crime. In some examples, prediction component 402 may, for each respective training instance, and based on a respective remittance amount and respective data that characterizes a crime for the training instance, modify the bounty model 410 to change a likelihood predicted by the bounty model 410 for a remittance amount in response to a subsequent crime profile applied to the bounty model 410.

Figure 5:
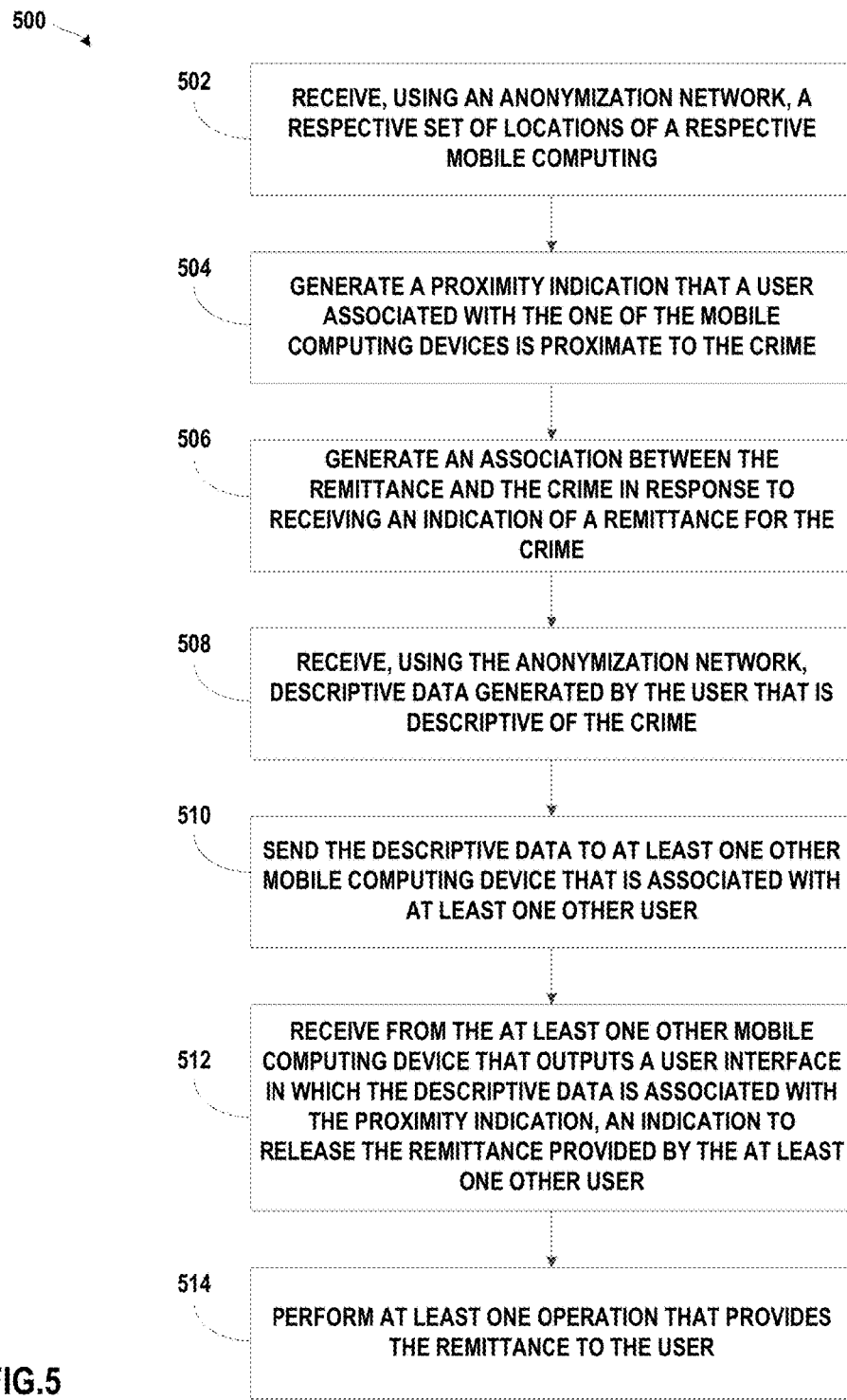
FIG. 5 is a flow diagram illustrating example operations of a server computing device, in accordance with techniques of this disclosure.

FIG. 5 is a flow diagram illustrating example operations of a server computing device, in accordance with techniques of this disclosure. For purposes of illustration only, the example operations (500) may be performed by server computing device 116A in FIG. 1 or server computing device 200 in FIG. 2. Using server computing device 116A as an example, server computing device 116A may be communicatively coupled to a plurality of mobile computing devices. Server computing device 116A may receive, using an anonymization network and from a respective mobile computing device of the plurality of mobile computing devices, a respective set of locations of the respective mobile computing (502). The respective source addresses of the plurality of mobile computing devices may be unknown to server 116A computing device based on using the anonymization network.

Server computing device 116A may generate, based at least in part on a determination that a location from the respective set of locations of the respective mobile computing device is within a threshold distance of a location of a crime, a proximity indication that a user associated with the respective mobile computing device is proximate to the crime (504). Server computing device 116A may, in response to receiving an indication of a remittance for the crime, generate an association between the remittance and the crime (506). Server computing device 116A may receive, using the anonymization network, descriptive data generated by the user that is descriptive of the crime (508). Server computing device 116A may send the descriptive data to at least one other mobile computing device of the plurality of mobile computing devices that is associated with at least one other user (510).

Server computing device 116A may receive, from the at least one other mobile computing device that outputs a user interface in which the descriptive data is associated with the proximity indication, an indication to release the remittance provided by the at least one other user (512). In response to receiving the indication, server computing device 116A may perform at least one operation that provides the remittance to the user (514).

Figure 6:
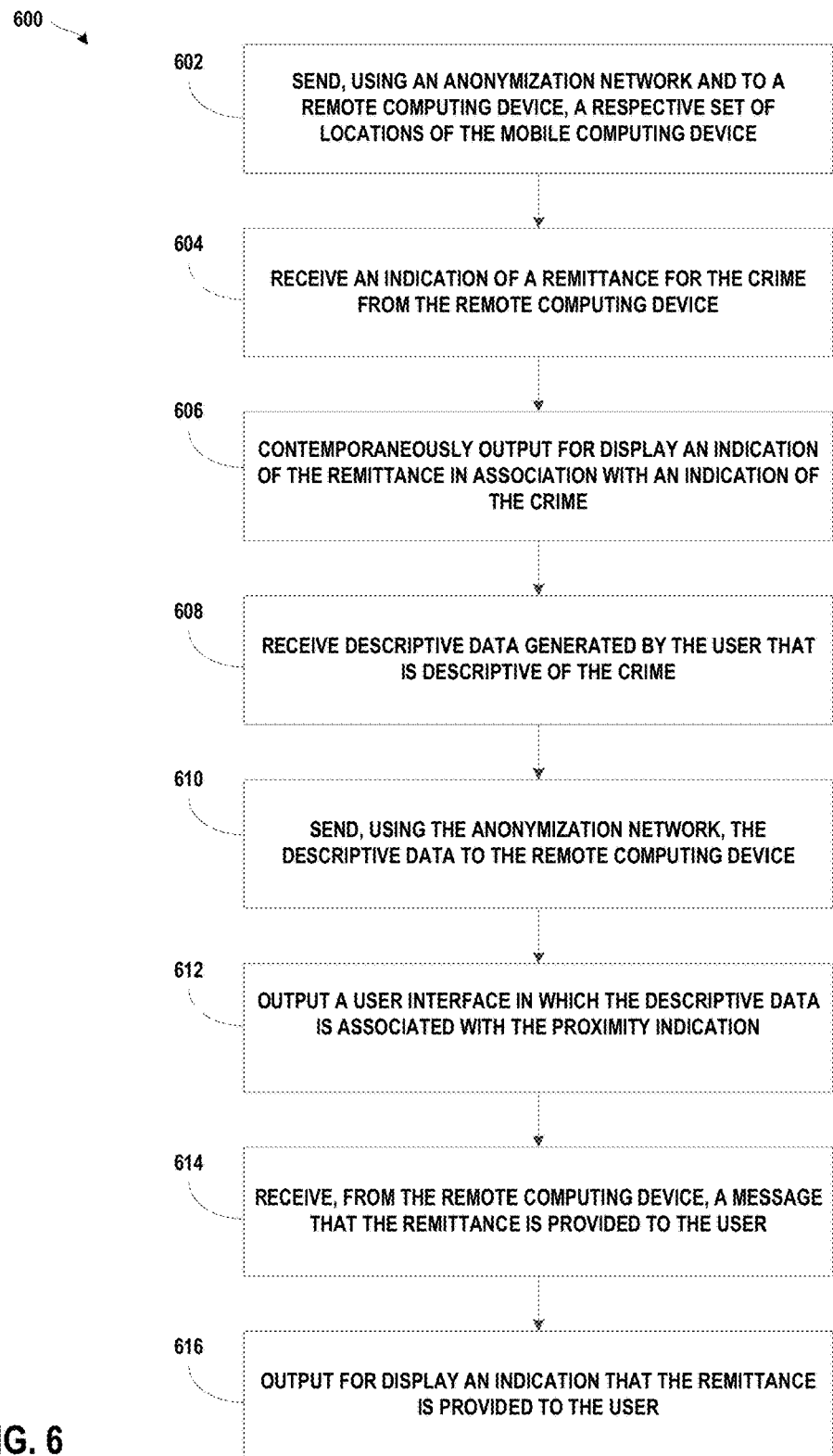
FIG. 6 is a flow diagram illustrating example operations of a mobile computing device, in accordance with techniques of this disclosure.

FIG. 6 is a flow diagram illustrating example operations of a mobile computing device, in accordance with techniques of this disclosure. For purposes of illustration only, the example operations 600 may be performed by mobile computing device 110B in FIG. 1 or mobile computing device 300 in FIG. 3. Using mobile computing device 110B as an example, mobile computing device 110B may send, using an anonymization network and to a remote computing device, a respective set of locations of the mobile computing device (602). I some examples, the respective source address of mobile computing device 110B is unknown to the remote computing device. The respective set of locations may be usable by the remote computing device to generate, based at least in part on a location from a set of locations being within a threshold distance of a location of a crime, a proximity indication that a user associated with mobile computing devices is proximate to the crime.

Mobile computing device 110B may receive an indication of a remittance for the crime from the remote computing device (604). In some response to receiving the indication, mobile computing device 110B may contemporaneously output for display an indication of the remittance in association with an indication of the crime (606). Mobile computing device 110B may receive descriptive data generated by the user that is descriptive of the crime (608). Mobile computing device 110B may send, using the anonymization network, the descriptive data to the remote computing device (610). Mobile computing device 110B may output a user interface in which the descriptive data is associated with the proximity indication (612). Mobile computing device 110B may receive, from the remote computing device, a message that the remittance is provided to the user (614). In response to receiving the message, mobile computing device 110B may output for display an indication that the remittance is provided to the user (616).

Figure 7:
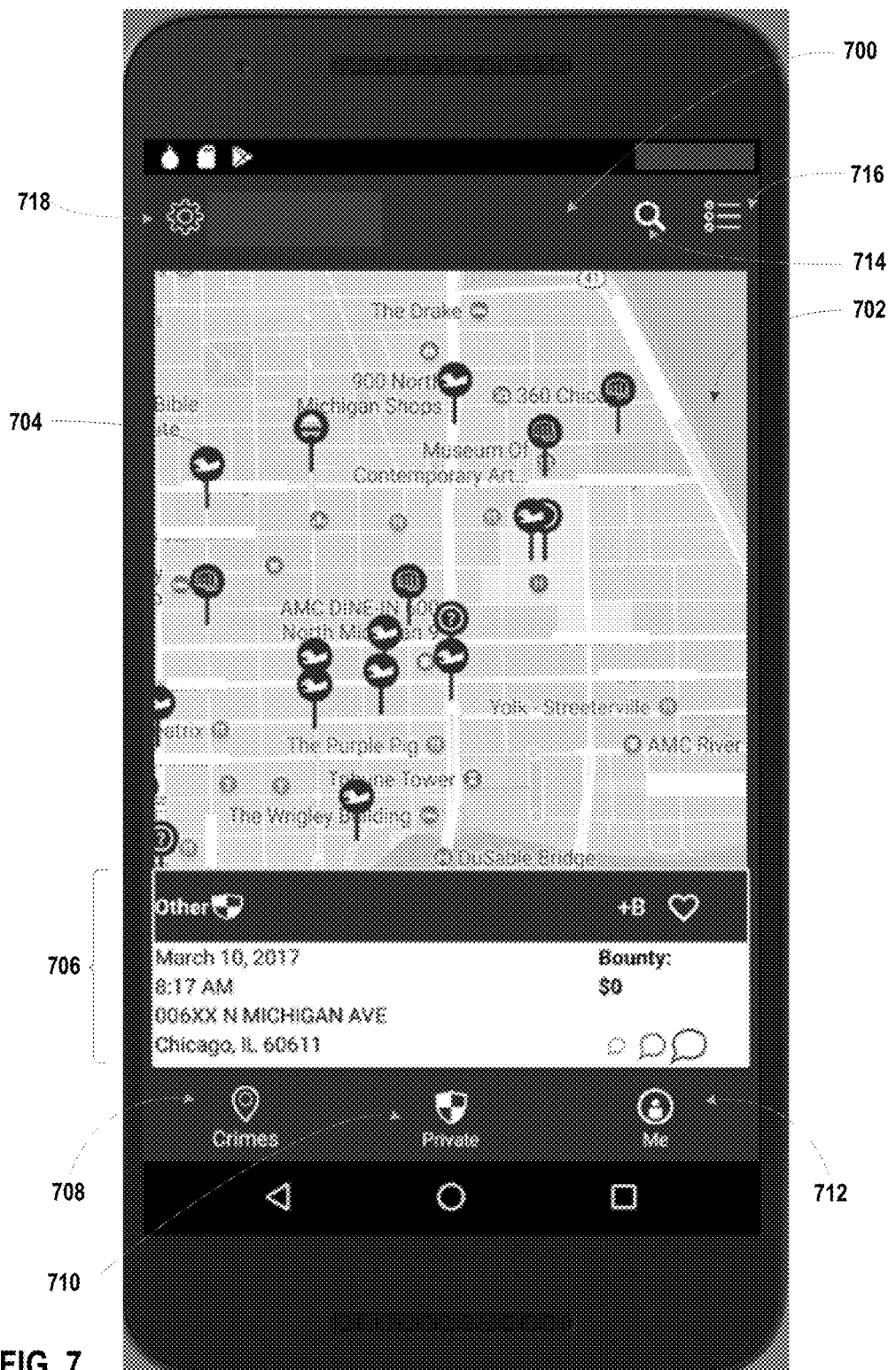
FIG. 7 illustrates a crime map graphical user interface that may be output by a mobile computing device in accordance with techniques of this disclosure.

FIG. 7 illustrates a crime map graphical user interface 700 that may be output by a mobile computing device in accordance with techniques of this disclosure. Graphical user interface (GUI) 700 may be output for display by mobile computing device 110B of FIG. 1 or mobile computing device 300 of FIG. 3. Although graphical elements having various functionality are output for display at certain locations of graphical user interface 700, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 700, such graphical elements may, in different examples, be output for display with different appearances, shapes, size, animations, or any other visual characteristics of graphical user interfaces without deviating from the spirit and scope of the techniques of this disclosure.

GUI 700 includes map graphical element 702. Map graphical element 702 may illustrate a map of a particular area, such as a city. In some examples, map graphical element 702 may be scrollable, in response to user input, in any direction on an X-Y plane, such that different areas of an area may be output for display. May graphical element 702 may be implemented as a control provided in a library, runtime, or other component.

As shown in FIG. 7, map graphical element 702 may include one or more crime location indicators, such as indicator 704. Each crime location indicator 704 may represent a location of a crime that has occurred at a particular location within a map of a particular area. Crime location indicator 704 may be based on data sent by a server computing device to mobile computing device 110B. The data sent by the server computing device may include a set of crime locations for different crimes and may include other data about the crimes including but not limited to, time of crime, type of crime, street address of crime or any other suitable data or data described in this disclosure. Mobile computing device 110B may populate map graphical element 702 with crime location indicators based on the data received from the server computing device. In some examples, the visual appearance of a crime location indicate may represent a type of crime. For example, crime location indicator 704 may indicate a Theft crime based the appearance of an outstretched hand icon.

Figure 9:
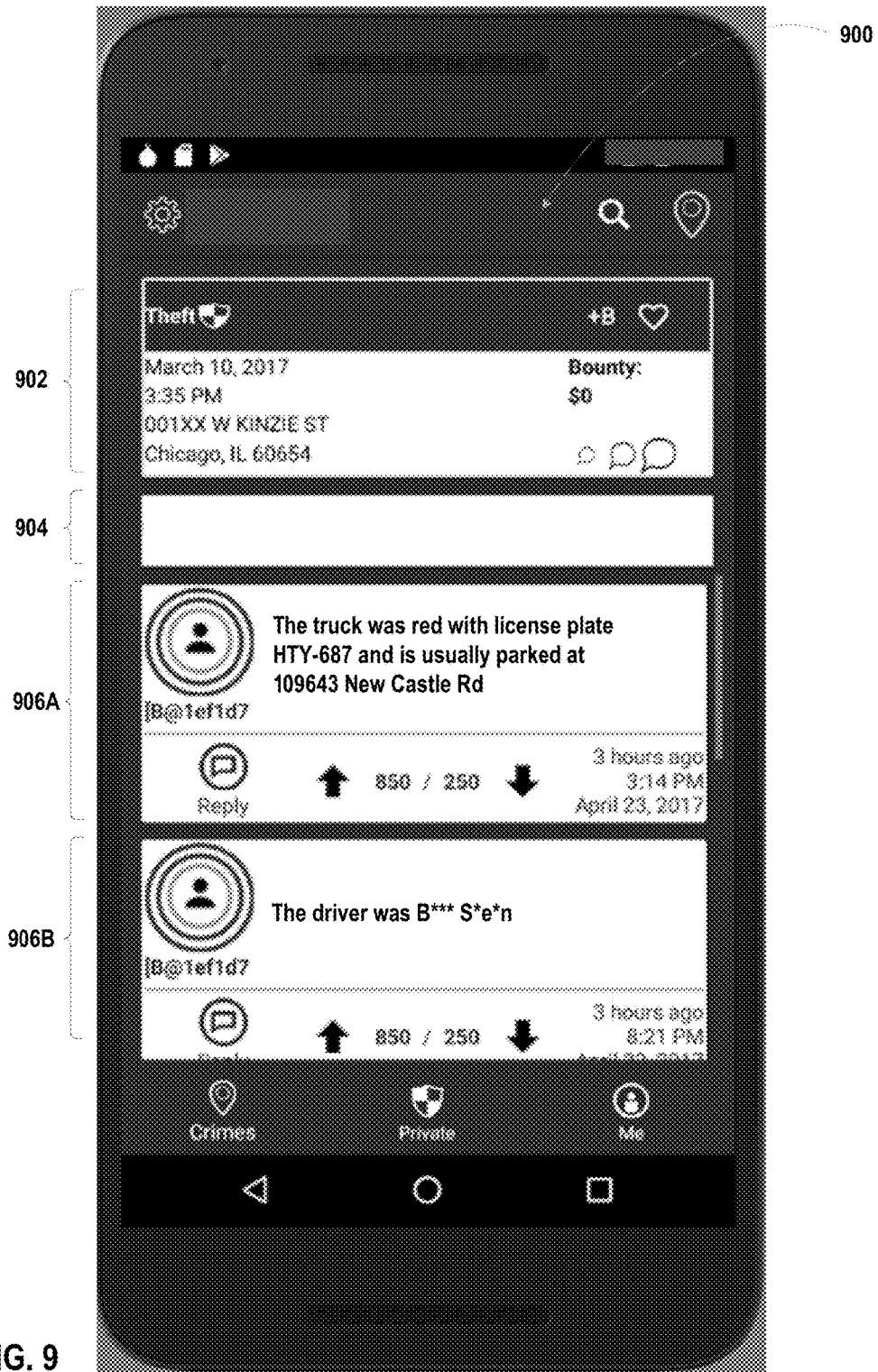
FIG. 9 illustrates a crime discussion graphical user interface that may be output by a mobile computing device in accordance with techniques of this disclosure.

In some examples, GUI 700 may include crime element 706. Initially, when map graphical element 702 is output for display, crime element 706 may not be shown. In response to receiving an indication of user input to select a crime location indicator in map graphical element 702, mobile computing device 110B may output for display crime element 706. In some examples, the indication of user input may re-center map graphical element 702, such that the selected crime location indicator is at the center of map graphical element 702. In any case, crime element 706 may include crime information for the crime that corresponds to the selected crime location indicator. Crime element 706 may include crime information as described with respect to crime element 134 of FIG. 1. In other examples, crime element 706 may include additional or less information than crime element 134 of FIG. 1. In some examples, an indication of user input that selects crime element 706 may cause computing device 110B to output for display graphical user interface 900, as shown in FIG. 9.

GUI 700 may include crime user interface indicator 708, private message user interface indicator 710, and me user interface indicator 712. Crime user interface indicator 708, when selected by an indication of user input, may cause mobile computing device 110B to output GUI 700. Private message user interface indicator 710, when selected by an indication of user input, may cause mobile computing device 110B to output GUI 1100 in FIG. 11. Me user interface indicator 712, when selected by an indication of user input, may cause mobile computing device 110B to output GUI 1400 in FIG. 14.

GUI 700 may include search indicator 714 that, when selected by an indication of user input, outputs for display an input field. A user may enter text into the input field. Mobile computing device 110B may search within the user application for content that corresponds to the entered text. The content may be output for display within a graphical user interface. GUI 700 may include list indicator 716 that, when selected by an indication of user input, may cause mobile computing device 110B to output GUI 800 in FIG. 8.

Figure 8:
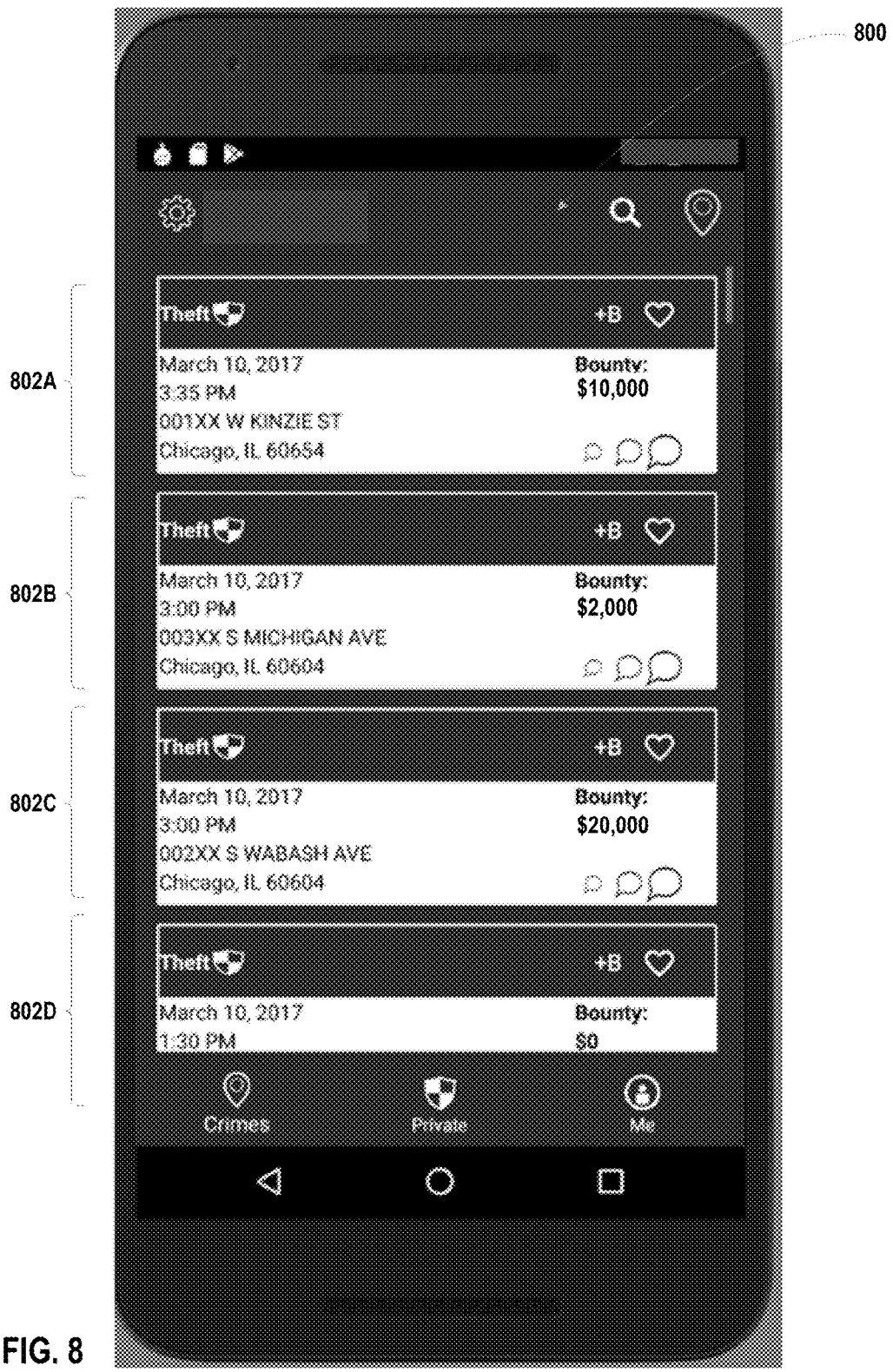
FIG. 8 illustrates a crime list summary graphical user interface that may be output by a mobile computing device in accordance with techniques of this disclosure.

FIG. 8 illustrates a crime list summary graphical user interface 800 that may be output by a mobile computing device in accordance with techniques of this disclosure. Graphical user interface (GUI) 800 may be output for display by mobile computing device 110B of FIG. 1 or mobile computing device 300 of FIG. 3. Although graphical elements having various functionality are output for display at certain locations of graphical user interface 800, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 800, such graphical elements may, in different examples, be output for display with different appearances, shapes, size, animations, or any other visual characteristics of graphical user interfaces without deviating from the spirit and scope of the techniques of this disclosure.

As shown in FIG. 8, GUI 800 may include a set of crime elements 802A-802D ("crime elements 802"). Although four crime elements are illustrated in FIG. 8, any number of crime elements may be shown. GUI 800 may be scrollable, such that in response to receiving an indication of user input, crime elements 802 may scroll up or down along the longer-side, vertical axis of GUI 800. In some examples, crime information of each respective crime element corresponds to a crime associated with a crime location indicator as shown in FIG. 7. For instance, if mobile computing device 110B receives an indication of user to select list indicator 716 in FIG. 7, then mobile computing device 110B may output for display GUI 800 with a list of crime elements that correspond to crimes of the crime location indicators that were visible or within a threshold distance of a point (e.g., center of map graphical element) in GUI 700. In some examples, selecting a crime element, such as crime element 802A may cause mobile computing device 110B to output for display a crime discussion graphical user interface, such as crime discussion user interface 900 as shown in FIG. 9.

FIG. 9 illustrates a crime discussion graphical user interface 900 that may be output by a mobile computing device in accordance with techniques of this disclosure. Graphical user interface (GUI) 900 may be output for display by mobile computing device 110B of FIG. 1 or mobile computing device 300 of FIG. 3. Although graphical elements having various functionality are output for display at certain locations of graphical user interface 900, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 900, such graphical elements may, in different examples, be output for display with different appearances, shapes, size, animations, or any other visual characteristics of graphical user interfaces without deviating from the spirit and scope of the techniques of this disclosure.

GUI 900 may include crime element 902. Crime element 902 may include crime information as described with respect to crime element 134 of FIG. 1. In other examples, crime element 902 may include additional or less information than crime element 134 of FIG. 1. GUI 900 may include input field 904. Input field 904 may receive input from a user (e.g., text, images, videos, audio, location, or any other content), which may be stored (e.g., at a server computing device) in association with crime information for crime element 902. In some examples, in response to a user providing input, a new discussion element (e.g., as described in FIG. 1), such as discussion element 906A may be output for display in GUI 900 with the discussion information corresponding to the provided input. In some examples, the server computing device that receives such discussion information may send such discussion information to other mobile computing devices, which can also respectively output for display a discussion element with the discussion information. In some examples, a discussion element may be output for display (e.g., in a notification and/or GUI such as GUI 900) in real-time in response to receiving the discussion information. Discussion elements 906 may include replies from different users with discussion information that corresponds to the crime indicated in crime element 902. Discussion elements 906A and 906B may include discussion information as described with respect to discussion element 136A of FIG. 1. In other examples, crime element 902 may include additional or less information than discussion element 136A of FIG. 1.

Figure 10:
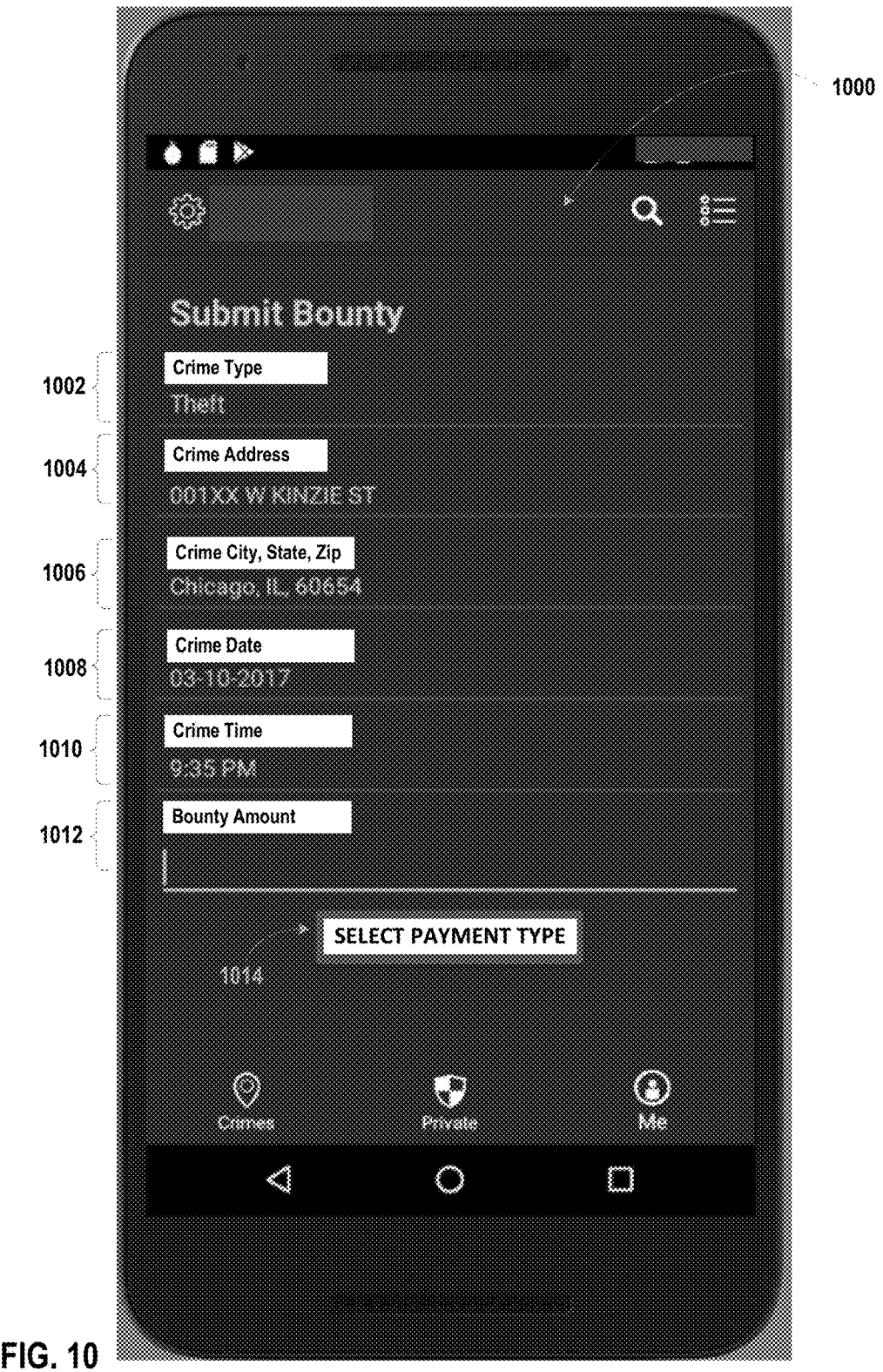
FIG. 10 illustrates a submit bounty graphical user interface that may be output by a mobile computing device in accordance with techniques of this disclosure.

FIG. 10 illustrates a submit bounty graphical user interface 1000 that may be output by a mobile computing device in accordance with techniques of this disclosure. Graphical user interface (GUI) 1000 may be output for display by mobile computing device 110B of FIG. 1 or mobile computing device 300 of FIG. 3. Although graphical elements having various functionality are output for display at certain locations of graphical user interface 1000, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 1000, such graphical elements may, in different examples, be output for display with different appearances, shapes, size, animations, or any other visual characteristics of graphical user interfaces without deviating from the spirit and scope of the techniques of this disclosure.

GUI 1000 may include one or more text and/or input fields that include information describing a crime to which a bounty will be assigned. For instance, GUI 1000 may be output for display in response to a user providing an indication of user input to select a bounty submit icon, such as bounty submit icon 149 as illustrated in FIG. 1, although any suitable user input and/or icon/indicator may be used to cause GUI 1000 to be displayed. In any event, GUI 1000 may include crime type information 1002, which may include a crime type (e.g., "Theft") and a descriptive label to indicate the type of information (e.g., "Crime Type"). GUI 1000 may include crime street address information 1004, which may include a street address of a crime (e.g., "001XX W Kinzie St") and a descriptive label to indicate the type of information (e.g., "Crime Street Address"). GUI 1000 may include crime city/state/zip information 1006, which may include a city, state, and/or zip code of a crime (e.g., "Chicago, Ill., 60654") and a descriptive label to indicate a type of information (e.g., "Crime City, State, Zip"). GUI 1000 may include crime date information 1008, which may include a date of a crime (e.g., "03-10-2017") and a descriptive label to indicate a type of information (e.g., "Crime Date"). GUI 1000 may include crime time information 1010, which may include a time of a crime (e.g., "9:35 PM") and a descriptive label to indicate a type of information (e.g., "Crime Time").

GUI 1000 may include bounty information 1012, which may include an amount of a bounty that a user will assign to a crime and a descriptive label to indicate a type of information (e.g., "Bounty Amount"). As described in this disclosure a bounty amount may be any quantity of current or other denomination of value. GUI 1000 may include a select payment type indicator 1014. Payment select indicator 1014 may be a button as shown in FIG. 10 or may be any other suitable graphical element. In any case, when selected by an indication of user input, payment select indicator 1014 may present a graphical user interface for a user to select a payment type (e.g., PayPal, Bitcoin, or any other suitable payment type). In some examples, select payment indicator 1014 may initiate the transaction to assign the bounty amount with the crime without presenting a GUI for a user to select a payment type. For instance, a default payment type may already be configured and used for the transaction without requiring a selection of a payment type.

Figure 11:
FIG. 11 illustrates a private message summary graphical user interface that may be output by a mobile computing device in accordance with techniques of this disclosure.

FIG. 11 illustrates a private message summary graphical user interface 1100 that may be output by a mobile computing device in accordance with techniques of this disclosure. Graphical user interface (GUI) 1100 may be output for display by mobile computing device 110B of FIG. 1 or mobile computing device 300 of FIG. 3. Although graphical elements having various functionality are output for display at certain locations of graphical user interface 1100, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 1100, such graphical elements may, in different examples, be output for display with different appearances, shapes, size, animations, or any other visual characteristics of graphical user interfaces without deviating from the spirit and scope of the techniques of this disclosure.

Figure 12:
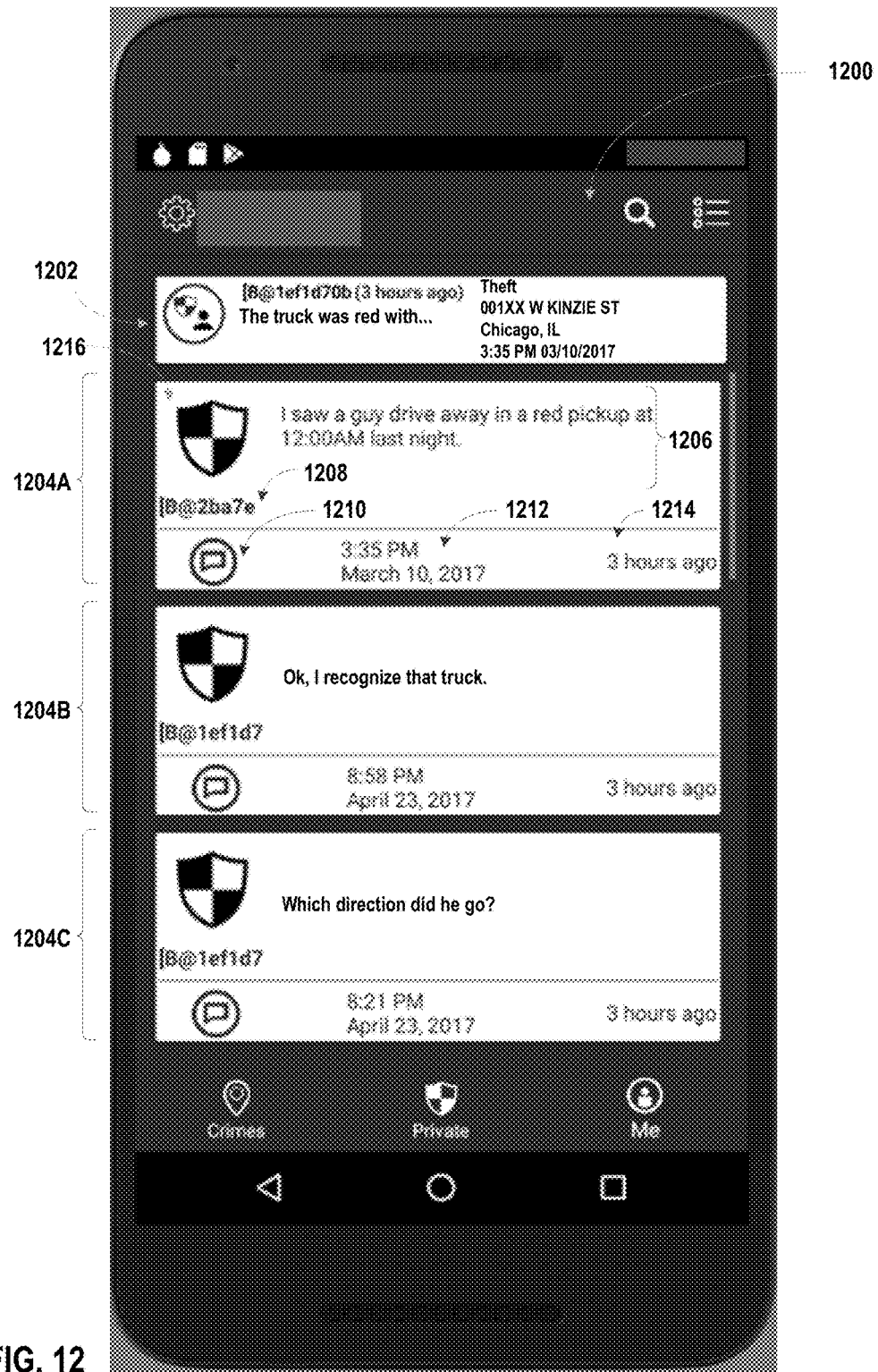
FIG. 12 illustrates a private message graphical user interface that may be output by a mobile computing device in accordance with techniques of this disclosure.

GUI 1100 may include a set of private message summary elements 1102A-1102B ("private message summary elements 1102"). Although two private message summary elements 1102 are shown in GUI 1100, any number of private message summary elements may be shown in GUI 1100. A private message summary element (e.g., 1102A), may include a summary of private discussion information that is exchanged in a message conversation between a user and a source of authority (e.g., a law enforcement agency), such as shown in FIG. 12. Private message summary element 1102A may include private message icon 1104, which may visually represent a message conversation between a user and a source of authority. In some examples, private message summary element 1102A may include user identification element 1106, which is a user identifier for a user that provided private information 1110. All or a portion of private information 1110 may be included in private message summary element 1102A. Private message summary element 1108 may include time-elapsed value 1108, which indicates the amount of time elapsed between a current time that private message summary element 1108 is display and when a user submitted private information 1110. In some examples, private message summary element 1102A may include crime information 1112, which may include crime type, crime street address, crime city, crime state, crime zip code, crime time, crime date, and/or any other characteristics or descriptive data of a crime. In some examples, the private information 1110 corresponds to the most recent private information exchanged in a message conversation between a user and a source of authority.

FIG. 12 illustrates a private message graphical user interface 1200 that may be output by a mobile computing device in accordance with techniques of this disclosure. Graphical user interface (GUI) 1200 may be output for display by mobile computing device 110B of FIG. 1 or mobile computing device 300 of FIG. 3. Although graphical elements having various functionality are output for display at certain locations of graphical user interface 1200, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 1200, such graphical elements may, in different examples, be output for display with different appearances, shapes, size, animations, or any other visual characteristics of graphical user interfaces without deviating from the spirit and scope of the techniques of this disclosure.

GUI 1200 may include private message summary element 1202 and one or more private message elements 1204A-1204C ("private message elements 1204"). Private message elements 1204 may respectively represent messages or other content shared between a user and a source of authority. In some examples, private message elements may only be viewable to a particular user that is operating the mobile computing device and one or more other users that are assigned a particular type of role (e.g., are a source of authority). In this way, a user may privately communicate with a source of authority in order to share additional or different information that may not be shared in GUI 900.

Private message element 1204A, for example, may include user icon 1216, which may represent a particular user or a particular role or type of user that provided private message information 1206. Private message information 1206 may be any type of content such as text, images, videos, audio, or any other type of content. Private message information 1206 may be created and submitted by a user. Private message element 1204A may include user identification element 1208, which may be a unique identifier of the user that submitted private message information 1206. Private message element 1204A may include reply element 1210, which when selected by a user, changes GUI 1200 (e.g., outputs an input field or other graphical element) to enable a user to provide content in reply to private message information 1206. Private message element 1204A may include timestamp 1212, which may indicate a date and/or time when the private message information 1206 was created. In some examples, private message element 1204A may include time-elapsed value 1214, which indicates an amount of time elapsed between the date and time when message information 1206 was created and the current time when time-elapsed value 1214 is displayed.

Figure 13:
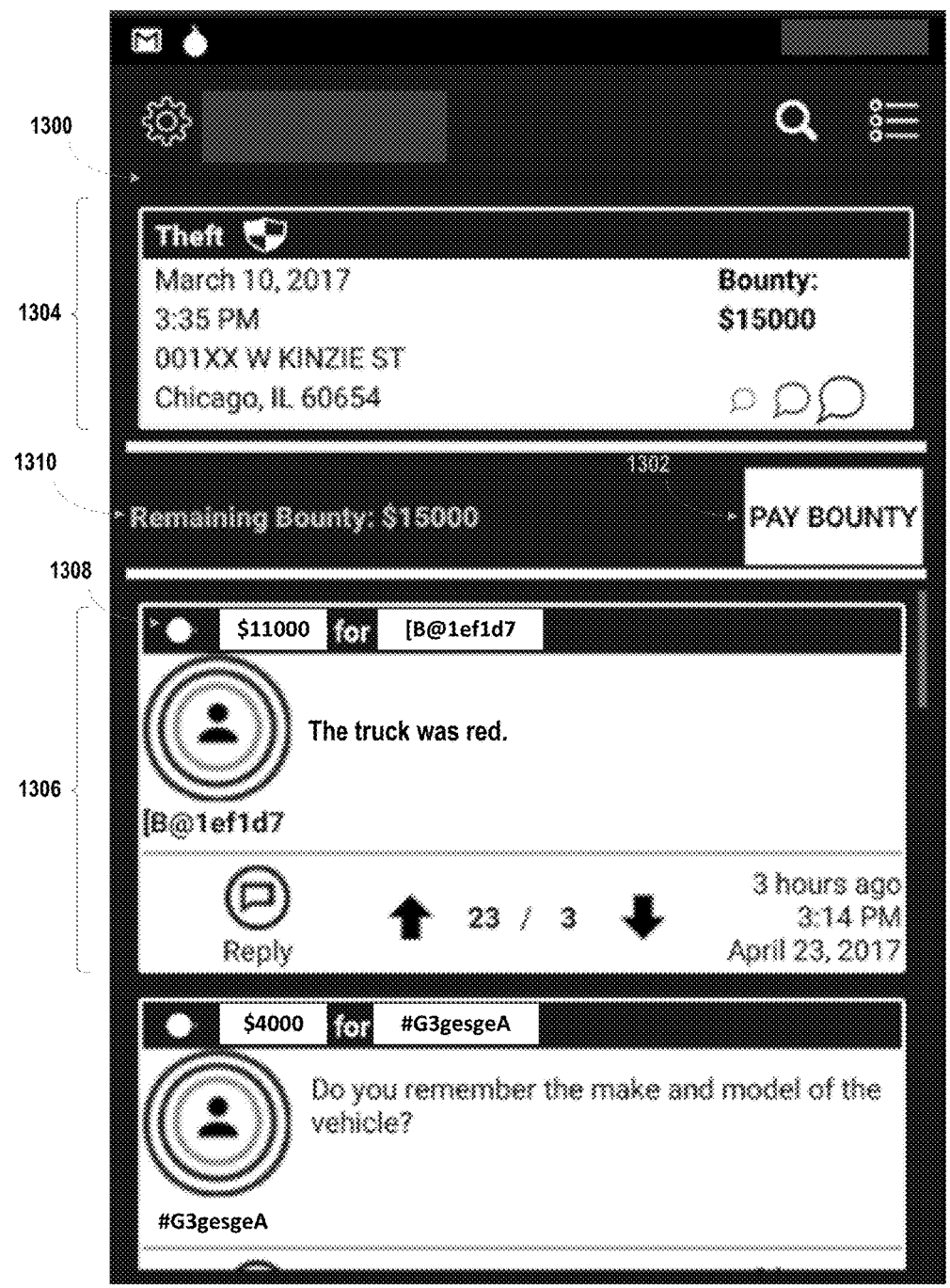
FIG. 13 illustrates a release payment graphical user interface that may be output by a mobile computing device in accordance with techniques of this disclosure.

FIG. 13 illustrates a release payment graphical user interface 1300 that may be output by a mobile computing device in accordance with techniques of this disclosure. Graphical user interface (GUI) 1300 may be output for display by mobile computing device 110B of FIG. 1 or mobile computing device 300 of FIG. 3. Although graphical elements having various functionality are output for display at certain locations of graphical user interface 1300, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 1300, such graphical elements may, in different examples, be output for display with different appearances, shapes, size, animations, or any other visual characteristics of graphical user interfaces without deviating from the spirit and scope of the techniques of this disclosure.

GUI 1300 may be output for display so that a user may release a remittance for a bounty to one or more users. For instance, a source of authority may identify information that is particularly useful or valuable to solve the particular crime, discourage future crimes, and/or improve the safety of the neighborhood or region around the crime. Accordingly, the user may provide an indication of user input to select an icon or otherwise cause mobile computing device 110B to output GUI 1300 for display. GUI 1300 may include crime element 1304, which may have the same or similar functionality to crime elements described in this disclosure. In some examples, GUI 1300 may initially indicate a remaining bounty amount that represents the total bounty amount for a crime. In some examples, GUI 1300 may include discussion elements, such as discussion element 1306, which may include the same or similar functionality as other discussion elements described in this disclosure. In some examples, a payment selector, such as payment selector 1308, may be associated with each respective discussion element. Payment selector 1308 may be a graphical element that a user may select or adjust to assign some portion of remaining bounty amount 1310 to the user that provided discussion information in the discussion element to which the payment selector 1308 is associated. For instance, a user may change payment selector 1308 such that $11,000 of the total bounty amount is assigned to the user that provided the discussion information for discussion element 1306. Similarly, the remaining bounty amount may be assigned to one or more other users.

GUI 1300 may include bounty payment element 1302. Bounty payment element 1302 may be any selectable graphical element such as a button. When bounty payment element 1302 is selected, remittances may be provided to each respective user as described in this disclosure based on the respective values of the payment selectors, such as payment selector 1308. In this way, users may be compensated (in some cases anonymously) in exchange for providing information that is useful or valuable to solve the particular crime, discourage future crimes, and/or improve the safety of the neighborhood or region around the crime.

Figure 14:
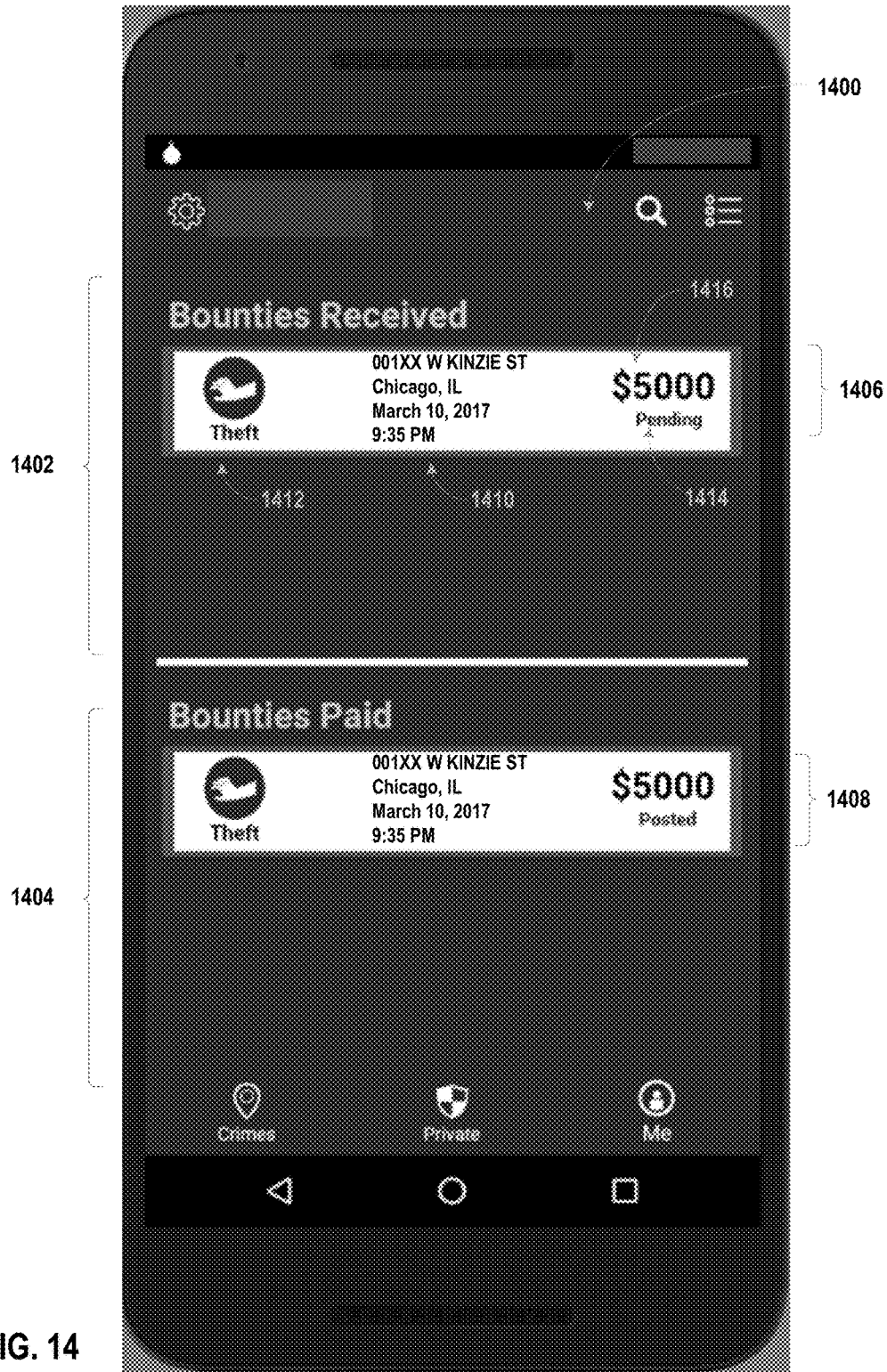
FIG. 14 illustrates a user graphical user interface that may be output by a mobile computing device in accordance with techniques of this disclosure.

FIG. 14 illustrates a user graphical user interface 1400 that may be output by a mobile computing device in accordance with techniques of this disclosure. Graphical user interface (GUI) 1400 may be output for display by mobile computing device 110B of FIG. 1 or mobile computing device 300 of FIG. 3. Although graphical elements having various functionality are output for display at certain locations of graphical user interface 1400, such graphical elements may, in different examples, be positioned in different locations of graphical user interfaces without deviating from the spirit and scope of the techniques of this disclosure. Although graphical elements having various functionality are output for display with certain appearances, shapes, size, animations, or any other visual characteristics in graphical user interface 1400, such graphical elements may, in different examples, be output for display with different appearances, shapes, size, animations, or any other visual characteristics of graphical user interfaces without deviating from the spirit and scope of the techniques of this disclosure.

GUI 1400 may include bounty or remittance received region 1402 and a bounty or remittance paid region 1404. Regions 1402 and 1404 may each include a list of remittance elements, such as remittance element 1406 and remittance element 1408. Remittance element 1406, may include or represent details of a remittance received by the user, while remittance element 1408 may include or represent details of a remittance paid by the user. In some examples, remittance element 1406 and/or 1408 may be selectable. For instance, if a user provides user input to select remittance element 1406, mobile computing device 110B may generate for display a different graphical user interface which, for example, may enable the user to select a type of payment (e.g., PayPal, BitCoin, etc.) that the user may receive the remittance.

Remittance element 1406 may include a crime type icon 1414, which indicates the type of crime for which the bounty was received. Remittance element 1406 may include crime details 1410, which as street address, city, state, zip code, date and time of the crime for which the remittance is paid. In some examples, remittance element 1406 may include the remittance amount 1416. In some examples, remittance element 1406 may include a remittance status, which may include Pending, Received, or any other status. Similarly, remittance element 1408 for a remittance that is paid may include a remittance status such as Posted, Paid, or any other status.

Although systems and techniques herein have been described with respect to crimes, these systems and techniques may be adapted within the spirit and scope of this disclosure to any event, occurrence, gathering, assembly, environment or other instance where users may share information anonymously and/or can be compensated for such information.

Example 1

A system comprising: a plurality of mobile computing devices associated with a plurality of respective users; an anonymization network; at least one server computing device communicatively coupled to each mobile computing device of the plurality of mobile computing devices, and wherein each respective mobile computing device of the plurality of mobile computing devices sends, using the anonymization network, a respective set of locations of the respective mobile computing to the at least one server computing device, such that the plurality of mobile computing devices are anonymous to the at least one server computing device; wherein the at least one server computing device, based at least in part on a determination that a location from a set of locations of one of the mobile computing devices is within a threshold distance of a location of a crime, generates a proximity indication that a user associated with the one of the mobile computing devices is proximate to the crime; wherein the at least one server computing device, in response to receiving an indication of a remittance for the crime from at least one other user, stores an association between the remittance and the crime; wherein the at least one server computing device, in response to receiving, using the anonymization network, descriptive data generated by the user that is descriptive of the crime, sends the descriptive data to at least one other mobile computing device of the plurality of computing devices that is associated with the at least one other user; and wherein the server computing device performs at least one operation that provides the remittance to the user in response to receiving, from the at least one other mobile computing device that outputs a user interface in which the descriptive data is associated with the proximity indication, an indication to release the remittance provided by the at least one other user.

Example 2

The system of Example 1, wherein the one of the mobile computing devices is a first mobile computing device and the at least one other mobile computing device is a second mobile computing device; wherein the anonymization network comprises a plurality of relay network devices, wherein the plurality of relay network devices includes an ingress relay network device communicatively coupled to the first mobile computing device, and the plurality of relay network devices comprises an egress relay network device communicatively coupled to the at least one server computing device, and wherein a set of intermediate relay network devices in a communication route between the ingress and egress relay network devices provide the communicate route between the first mobile computing device and the at least one server computing device; wherein the descriptive data is received by the ingress relay network device from the first mobile computing device, and wherein each relay network device in the set of relay network devices encrypts the descriptive data before the descriptive data is forwarded to another relay network device in the communicate route; and wherein the egress relay network device decrypts the descriptive data and forwards the descriptive data to the at least one server computing device, such that the plurality of mobile computing devices are anonymous to the at least one server computing device.

Example 3

The system of any of Examples 1-2, wherein respective identifiers of the plurality of mobile computing devices are respective source network addresses of the respective mobile computing devices, and wherein the respective identifiers of the plurality of mobile computing devices are unknown to the at least one server computing device.

Example 4

The system of any of Examples 1-4, wherein the one of the mobile computing devices is a first mobile computing device; wherein a determination by the at least one server computing device that the location of the first mobile computing device is within a threshold distance of the location of the crime is based at least in part on a determination by the server computing device that a time duration between a first timestamp of the location of the first mobile computing device and a second timestamp of the crime satisfies a threshold.

Example 5

The system of any of Examples 1-5, wherein the proximity indication indicates at least one of a degree or an amount of at least one of a physical distance or temporal distance between the user and the crime.

Example 6

The system of any of Examples 1-5, wherein the at least one other mobile computing device outputs the user interface to contemporaneously include the descriptive data in association with the proximity indication and an amount of the remittance.

Example 7

The system of any of Examples 1-6, wherein the server computing device, to perform at least one operation that provides the remittance to the user: selects an account identifier of the user; generates a message that comprises the account identifier of the user, an account identifier of an account controlled by an operator of a service provided by the at least one server computing device, and an amount of the remittance; and sends the message to at least one remote computing device that executes a transaction that transfers at least a portion of the amount of the remittance from the account controlled by the operator to an account associated with the account identifier of the user.

Example 8

The system of any of Examples 1-7, wherein the portion of the amount of the remittance is denominated in a cryptocurrency and the account associated with the account identifier of the user is denominated in the cryptocurrency.

Example 9

The system of any of Examples 1-8, wherein the portion of the amount is a first portion, wherein the at least one server computing device, to perform at least one operation that provides the remittance to the user, determines a second portion of the amount based at least in part on the amount of the remittance and generates the first portion of the amount of the remittance based at least in part on the second portion.

Example 10

The system of any of Examples 1-9, wherein the at least one server computing device stores data that represents an association between a user identifier of the user and the remittance; wherein the at least one server computing device, in response to performance of the at least one operation that provides the remittance to the user, stores data that defines an association between a transaction identifier, an identifier of user, and an amount of the remittance; and wherein, in response to the remittance being transferred to an account of the user and from an account controlled by an operator of a service provided by the at least one server computing device, the at least one server computing device automatically destroys the data that defines the association between the transaction identifier, the identifier of user, and the amount of the remittance, such that the data that defines the association cannot be reconstructed.

Example 11

The system of any of Examples 1-10, wherein the at least one server computing device identifies, based at least in part on application of natural language processing to the descriptive data, an accusation in a semantic meaning of the descriptive data; wherein the at least one server computing device, in response to identification of the accusation, identifies at least a portion of content in the descriptive data that corresponds to the accusation; and wherein the at least one server computing device performs at least one operation to obfuscate at least the portion of the content in the descriptive data.

Example 12

The system of any of Examples 1-11, wherein to perform the at least one operation, the at least one server computing device: generates data that associates a label with one or more of the descriptive data or at least a portion of content in the descriptive data; or modifies at least the portion of the content in the descriptive data to change at least one of a character, pixel value, or sound of the descriptive data.

Example 13

The system of any of Examples 1-12, wherein the at least one server computing device receives a crime profile comprising data that characterizes the crime; wherein the at least one server computing device applies the data of the crime profile that characterizes the crime to a bounty model that predicts a likelihood that a remittance amount will produce information about the crime from one or more users; and wherein the at least one server computing device performs at least one operation based at least in part on the likelihood that the remittance amount will produce information about the crime from one or more users.

Example 14

The system of any of Examples 1-13, wherein the at least one server computing device selects a set of training instances, each training instance comprising an association between a remittance amount and data that characterizes a crime; and wherein for each respective training instance, the at least one server computing device, based on a respective remittance amount and respective data that characterizes a crime for the training instance, modifies the bounty model to change a likelihood predicted by the bounty model for a remittance amount in response to a subsequent crime profile applied to the bounty model.

Example 15

A method comprising: receiving, using an anonymization network and from a respective mobile computing device of a plurality of mobile computing devices, a respective set of locations of the respective mobile computing device, such that the respective mobile computing device is anonymous to the at least one server computing device; generating, by a computing device and based at least in part on a determination that a location from the respective set of locations of the respective mobile computing device is within a threshold distance of a location of a crime, a proximity indication that a user associated with the respective mobile computing device is proximate to the crime; in response to receiving an indication of a remittance for the crime from at least one other user, generating an association between the remittance and the crime; in response to receiving, using the anonymization network, descriptive data generated by the user that is descriptive of the crime, sending the descriptive data to at least one other mobile computing device of the plurality of mobile computing devices that is associated with the at least one other user; and performing at least one operation that provides the remittance to the user in response to receiving, from the at least one other mobile computing device that outputs a user interface in which the descriptive data is associated with the proximity indication, an indication to release the remittance provided by the at least one other user.

Example 16

The method of Example 16, further comprising performing any of the operations of any of the at least one server computing device in Examples 1-14.

Example 17

A computing device comprising one or more computer processors; and a memory comprising instructions that when executed by the one or more computer processors cause the one or more computer processors to perform any of the method of Examples 15-16.

Example 18

A computer-readable storage medium encoded with instructions that, when executed, cause at least one processor to perform any of the method of Examples 15-16.

Example 19

An apparatus comprising means for performing any of the method of Examples 15-16.

Example 20

A method comprising: sending, using an anonymization network and to a server computing device, a respective set of locations of a mobile computing device, such that the mobile computing device is anonymous to the server computing device, and wherein the respective set of locations are usable by the server computing device to generate, based at least in part on a location from a set of locations being within a threshold distance of a location of a crime, a proximity indication that a user associated with the mobile computing devices is proximate to the crime; in response to receiving an indication of a remittance for the crime from the server computing device, contemporaneously outputting for display an indication of the remittance in association with an indication of the crime; in response to receiving descriptive data generated by the user that is descriptive of the crime, sending, using the anonymization network, the descriptive data to the server computing device, and output a user interface in which the descriptive data is associated with the proximity indication; and in response to receiving, from the server computing device, a message that the remittance is provided to the user, outputting for display an indication that the remittance is provided to the user.

Example 21

The method of Example 20, further comprising performing any of the operations of any of the mobile computing devices in Examples 1-14.

Example 22

A computing device comprising one or more computer processors; and a memory comprising instructions that when executed by the one or more computer processors cause the one or more computer processors to perform any of the method of Examples 20-21.

Example 23

A computer-readable storage medium encoded with instructions that, when executed, cause at least one processor to perform any of the method of Examples 20-12.

Example 24

An apparatus comprising means for performing any of the method of Examples 20-21.

In one or more examples, the functions described above may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, compact disc read-only memory (CD-ROM) or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage medias. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A system comprising a plurality of mobile computing devices associated with a plurality of respective users;
   an anonymization network;
   at least one server computing device communicatively coupled to each mobile computing device of the plurality of mobile computing devices, and
   wherein a first mobile computing device of the plurality of mobile computing devices determines a respective set of locations of the first mobile computing device;
   wherein the at least one server computing device receives, via an anonymization network and from the first mobile computing device that determines a location from a set of locations of the first mobile computing device is within a threshold distance of a location of an event, a proximity indication that a first user associated with the first mobile computing device is proximate to the event, such that the first mobile computing device is anonymous to the at least one server computing device;
   wherein the at least one server computing device, in response to receiving an indication of a remittance for the event from a second user, stores an association between the remittance and the event;
   wherein the at least one server computing device, in response to receiving, using the anonymization network, descriptive data generated by the first user that is descriptive of the event, sends the descriptive data to a second mobile computing device of the plurality of computing devices that is associated with the second user, wherein the second mobile computing devices outputs a user interface in which the descriptive data is associated with a graphical element that is based at least in part on the proximity indication; and
   wherein the server computing device, in response to receiving an indication to release the remittance provided by the second user, sends a message that comprises at least an account identifier of the first user and an amount of the remittance to at least one remote computing device that executes a transaction that transfers at least a portion of the amount of the remittance to an account controlled by the first user and from an account controlled by an operator of a service provided by the at least one server computing device.

2. The system of claim 1, wherein the second mobile computing device outputs the user interface to contemporaneously include the descriptive data in association with the proximity indication and the amount of the remittance.

3. The system of claim 1, wherein the portion of the amount of the remittance is denominated in a cryptocurrency and the account associated with the account identifier of the first user is denominated in the cryptocurrency.

4. The system of claim 1, wherein the portion of the amount is a first portion, wherein the at least one server computing device, to perform at least one operation that provides the remittance to the first user, determines a second portion of the amount based at least in part on the amount of the remittance and generates the first portion of the amount of the remittance based at least in part on the second portion.

5. The system of claim 1,
   wherein the at least one server computing device stores data that defines an association between a transaction identifier, the account identifier of the first user, and the amount of the remittance; and
   wherein, in response to the remittance being transferred to the account of the first user and from the account controlled by the operator of the service provided by the at least one server computing device, the at least one server computing device automatically destroys the data that defines the association between the transaction identifier, the account identifier of the first user, and the amount of the remittance, such that the data that defines the association cannot be reconstructed.

6. The system of claim 1,
   wherein the at least one server computing device receives an event profile comprising data that characterizes the event;
   wherein the at least one server computing device applies the data of the event profile that characterizes the event to a bounty model that predicts a likelihood that a remittance amount will produce information about the event from one or more users; and
   wherein the at least one server computing device performs at least one operation based at least in part on the likelihood that the remittance amount will produce information about the event from one or more users.

7. The system of claim 6,
   wherein the at least one server computing device selects a set of training instances, each training instance comprising an association between a remittance amount and data that characterizes an event; and
   wherein for each respective training instance, the at least one server computing device, based on a respective remittance amount and respective data that characterizes an event for the training instance, modifies the bounty model to change a likelihood predicted by the bounty model for a remittance amount in response to a subsequent event profile applied to the bounty model.

8. A server computing device comprising:
   one or more computer processors; and
   a memory comprising instructions that when executed by the one or more computer processors cause the one or more computer processors to:
   receive, via an anonymization network and from a first mobile computing device that determines a location from a set of locations of the first mobile computing device is within a threshold distance of an event, a proximity indication that a first user associated with the first mobile computing device is proximate to the event, wherein the first mobile computing device is anonymous to the at least one server computing device;

in response to receiving an indication of a remittance for the event from a second user, generate an association between the remittance and the event;

in response to receiving, using the anonymization network, descriptive data generated by the first user that is descriptive of the event, send the descriptive data to a second mobile computing device that is associated with the second user, wherein the second mobile computing device outputs a user interface in which the descriptive data is associated with a graphical element that is based at least in part on the proximity indication; and in response to receiving an indication to release the remittance provided by the second user, send a message that comprises at least an account identifier of the first user and an amount of the remittance to at least one remote computing device that executes a transaction that transfers at least a portion of the amount of the remittance to an account associated with the first user and from an account controlled by at least one of the second user or an operator of a service provided by the at least one server computing device.

9. The server computing device of claim 8, wherein respective identifiers of the first and second mobile computing devices are respective source network addresses of the respective first and second mobile computing devices, and wherein the respective identifiers of the first and second mobile computing devices are unknown to the server computing device.

10. A mobile computing device comprising:

one or more computer processors; and a memory comprising instructions that when executed by the one or more computer processors cause the one or more computer processors to:

determine a respective set of locations of the mobile computing device and send, a server computing device using an anonymization network, a proximity indication generated by the mobile computing device, based at least in part on a location from a set of locations being within a threshold distance of a location of an event, wherein the mobile computing device is anonymous to the server computing device;

in response to receiving an indication of a remittance for the event from the server computing device, contemporaneously output for display an indication of the remittance in association with an indication of the event;

in response to receiving descriptive data generated by the user that is descriptive of the event, send, using the anonymization network, the descriptive data to the server computing device, and output a user interface in which the descriptive data is associated with a graphical element that is based at least in part on the with the proximity indication; and in response to receiving, from the server computing device that has sent a first message comprising at least an account identifier of the first user and an amount of the remittance to at least one remote computing device that executes a transaction that transfers at least a portion of the amount of the remittance to an account associated with the first user and from an account controlled by at least one of the second user or an operator of a service provided by the at least one server computing device, a second message that the remittance is provided to the user, output for display an indication that the remittance is provided to the user.

11. The mobile computing device of claim 10, wherein an identifier of the mobile computing device is a source network address of the mobile computing device, and wherein the identifier of the mobile computing device is unknown to the server computing device.

12. The mobile computing device of claim 10, wherein the memory comprises instructions that when executed by the one or more computer processors cause the one or more computer processors to output a user interface that contemporaneously includes the descriptive data in association with the proximity indication and an amount of the remittance.

* * * * *